US012617913B2

(12) United States Patent
Omenetto et al.

(10) Patent No.: US 12,617,913 B2
(45) Date of Patent: May 5, 2026

(54) REVERSIBLE WRINKLE PATTERNS AND METHODS OF MAKING AND USING THE SAME

(71) Applicant: Trustees of Tufts College, Medford, MA (US)

(72) Inventors: Fiorenzo G. Omenetto, Lexington, MA (US); Yu Wang, Medford, MA (US); Beom Joon Kim, Medford, MA (US)

(73) Assignee: TRUSTEES OF TUFTS COLLEGE, Medford, MA (US)

( * ) Notice: Subject to any disclaimer, the term of this patent is extended or adjusted under 35 U.S.C. 154(b) by 681 days.

(21) Appl. No.: 17/593,876

(22) PCT Filed: Mar. 27, 2020

(86) PCT No.: PCT/US2020/025386
§ 371 (c)(1),
(2) Date: Sep. 27, 2021

(87) PCT Pub. No.: WO2020/198648
PCT Pub. Date: Oct. 1, 2020

(65) Prior Publication Data
US 2022/0169811 A1 Jun. 2, 2022

Related U.S. Application Data

(60) Provisional application No. 62/824,962, filed on Mar. 27, 2019.

(51) Int. Cl.
*C08J 7/04* (2020.01)

(52) U.S. Cl.
CPC ......... *C08J 7/0427* (2020.01); *C08J 2383/04* (2013.01); *C08J 2489/00* (2013.01)

(58) Field of Classification Search
CPC .. C08J 7/0427; C08J 2383/04; C08J 2489/00; C08L 89/00
See application file for complete search history.

(56) References Cited

U.S. PATENT DOCUMENTS

| | | | |
|---|---|---|---|
| 10,441,185 B2* | 10/2019 | Rogers | A61B 5/4875 |
| 2011/0230747 A1* | 9/2011 | Rogers | A61L 31/047 |
| | | | 600/377 |
| 2016/0340826 A1* | 11/2016 | Tibbits | D06M 23/16 |
| 2018/0272030 A1* | 9/2018 | Brown | A61L 27/227 |

FOREIGN PATENT DOCUMENTS

WO     2020198648 A1    10/2020

OTHER PUBLICATIONS

Cheng, et al., "On the strength of beta-sheet crystallites of Bombyx mori silk fibroin", Journal of the Royal Society Interface 2014, vol. 11 p. 1 para 2, Jan. 1, 2014, 8 pages.

(Continued)

*Primary Examiner* — Nathan L Van Sell
(74) *Attorney, Agent, or Firm* — GTC Law Group PC & Affiliates

(57) ABSTRACT
The present disclosure relates to reversibly wrinkled silk-based compositions. The provided compositions are tunable and the reversible wrinkles are sensitive to water vapor, methanol vapor, and UV irradiation. The present disclosure also provides methods for making and using the same.

12 Claims, 10 Drawing Sheets

(56) References Cited

OTHER PUBLICATIONS

Figures 1A, 1B, 1C, 1D, 1E:
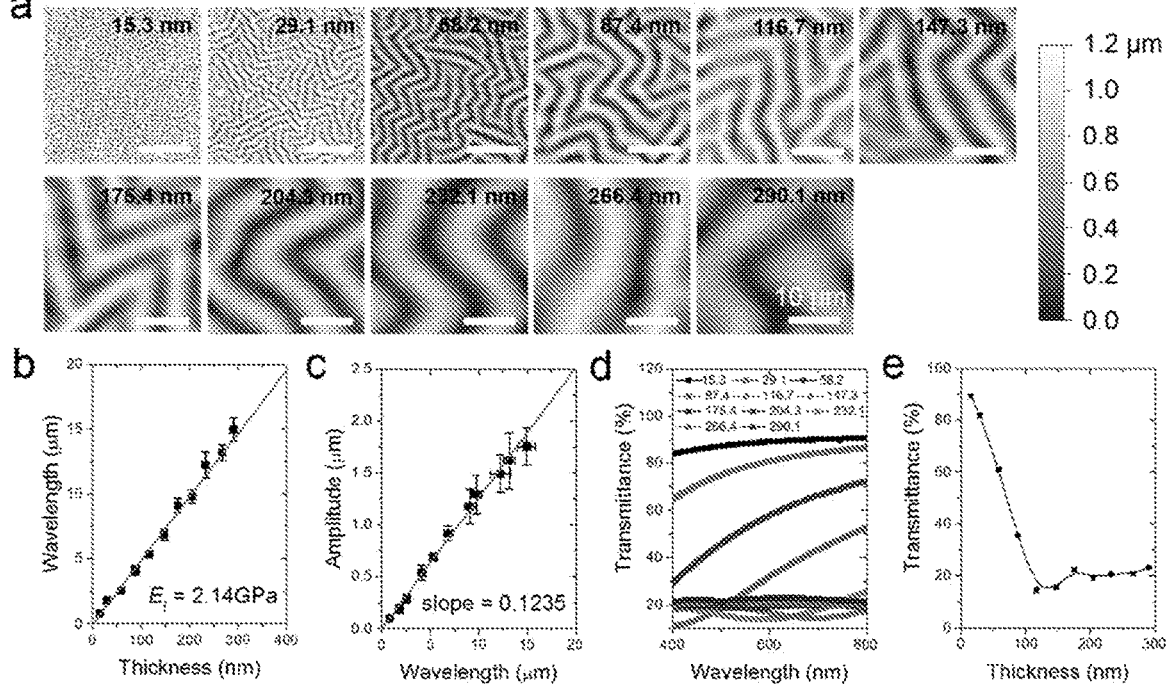

Healing Benefits , "How Parafilm is Made", Nov. 16, 2011 retrieved from <http://healingbenefits.blogspot.com/2011/11/how-is-parafilm-made.html> entirety of document especially p. 1 para 4, Nov. 16, 2011, 2 pages.

PCT/US2020/025386 , "International Application Serial No. PCT/US2020/025386, International Preliminary Report on Patentability mailed Sep. 28, 2021", Trustees of Tufts College, 6 pages.

PCT/US2020/025386 , "International Application Serial No. PCT/US2020/025386, International Search Report and Written Opinion mailed Jun. 23, 2020", Trustees of Tufts College, 8 pages.

Trevisan , et al., "Cocoon Silk: A Natural Architecture", Aug. 12, 2012 retrieved from <https://web.archive.org/web/20120812115543/http://www.senature.com/research/publications/cocoon-silk-a-natural-architecture> entirety of document especially p. 3 para 1-2, Aug. 12, 12, 6 pages.

Valentini , et al., "Combining Living Microorganisms with Regenerated Silk Provides Nanofibril-Based Thin Films with Heat-Responsive Wrinkled States for Smart Food Packaging", Nanomaterials 2018, vol. 8, No. 518. Entirety of document especially p. 1 para 1; p. 3 para 1; p. 2 para 4; p. 8 para 1, Jan. 1, 2018, 12 pages.

* cited by examiner

REVERSIBLE WRINKLE PATTERNS AND METHODS OF MAKING AND USING THE SAME

CROSS-REFERENCE TO RELATED APPLICATIONS

This patent application represents the U.S. national stage entry of International Application Ser. No. PCT/US2020/025386 filed on Mar. 27, 2020, which claims the benefit of priority of U.S. Provisional Application Ser. No. 62/824,962 filed on Mar. 27, 2019, entitled "Reversible Wrinkle Patterns and Methods of Making and Using the Same," the contents of each of which are hereby incorporated by reference herein.

STATEMENT REGARDING FEDERALLY FUNDED RESEARCH

This invention was made with government support under grant N00014-16-1-2437 awarded by the United States Navy. The government has certain rights in the invention.

BACKGROUND

Protein micropatterning and nanopatterning have long provided sophisticated strategies for a wide range of applications including biointerfaces, tissue engineering, optics/photonics, and bioelectronics. In recent years, various micro- and nanofabrication technologies have been utilized to transform a water-based suspension of silk protein into all sorts of final material formats with periodic or aperiodic micro- or nanopatterns. However, the resulting patterned structures were stable, irreversible, and largely insensitive to external stimuli. Accordingly, there remains a need for improved methods of fabricating reversible, multi-responsive protein-based micropatterns using silk fibroin as the stimuli-responsive component.

SUMMARY OF THE DISCLOSURE

The present disclosure addresses the aforementioned drawbacks by providing reversibly wrinkled silk-based compositions. The provided compositions are tunable and the reversible wrinkles are sensitive to water vapor, methanol vapor, and UV irradiation. The present disclosure also provides methods for making and using the same.

In one aspect, provided herein is an article of manufacture. The article of manufacture comprises or consists essentially of a layered composition comprising a silk fibroin substrate in direct contact with a flexible polymer substrate, where the layered composition, following heating and cooling of the layered composition, exhibits reversible wrinkles on at least a portion of a surface of the silk fibroin substrate, and wherein at least some of the reversible wrinkles are reduced or erased following exposure to water vapor, methanol vapor, or ultra violet (UV) radiation. The silk fibroin substrate can be or can comprise amorphous silk fibroin. The silk fibroin substrate can be or can comprise silk fibroin characterized by a presence of β-sheet formation. The silk fibroin substrate and the flexible polymer substrate can have different plane-strain moduli. The flexible polymer substrate can be or can comprise polydimethylsiloxane (PDMS). An extent of the change in reversible wrinkles can be tunable with exposure time. An extent of the change in reversible wrinkles can be tunable with water vapor exposure time. An extent of the change in reversible wrinkles can be tunable with methanol vapor exposure time. An extent of the change in reversible wrinkles can be tunable with UV radiation exposure time.

In another aspect, provided herein is a method of producing a reversible wrinkled surface. The method can comprise or consist essentially of applying a silk fibroin solution to a flexible polymer substrate to form a bilayer structure comprising a silk fibroin layer and a flexible polymer layer; heating the bilayer structure, whereby the bilayer structure expands in response to heat stimulus; and cooling the heated bilayer structure to form a reversibly wrinkled surface on the silk fibroin layer. The method can further comprise exposing at least a portion of the wrinkled silk surface of the silk fibroin layer to methanol vapor, water vapor, or ultraviolet (UV) light to remove surface wrinkling from the exposed portion, thereby forming a patterned reversible wrinkled surface. One or more shadow masks can be used to selectively expose at least a portion of the reversibly wrinkled surface. The silk fibroin layer can comprise amorphous silk protein. The silk fibroin layer can comprise crystalline silk protein. The silk fibroin and the flexible polymer can have different plane-strain moduli. The flexible polymer substrate can comprise polydimethylsiloxane (PDMS).

BRIEF DESCRIPTIONS OF THE DRAWINGS

FIGS. 1*a*-1*e* demonstrate wrinkle patterns with different thicknesses of silk film. a, AFM images. The heating temperature used to form wrinkle is 140° C. b, Dependence of wavelength on the thickness of silk film. c, The wrinkle amplitude as a function of wavelength. Solid lines in (b) and (c) are the fitted lines of the experimental data. d, Transmittance spectra of the wrinkled structures with different thicknesses of silk film. e, Dependence of transmittance at λ=630 nm on the thickness of silk film.

FIGS. 2*a*-2*e* demonstrate wrinkle patterns formed under different heating temperatures. a, AFM images. The thickness of silk film is fixed to 147 nm. b, Dependence of amplitude (black square) and wavelength (red square) on the temperature. c, Compression strain (ε) as a function of temperature. Solid line is the simulated curve. d, Transmittance spectra of wrinkled structures formed under different heating temperatures. e, Dependence of transmittance at λ=630 nm on the temperature.

Figures 3A, 3B:
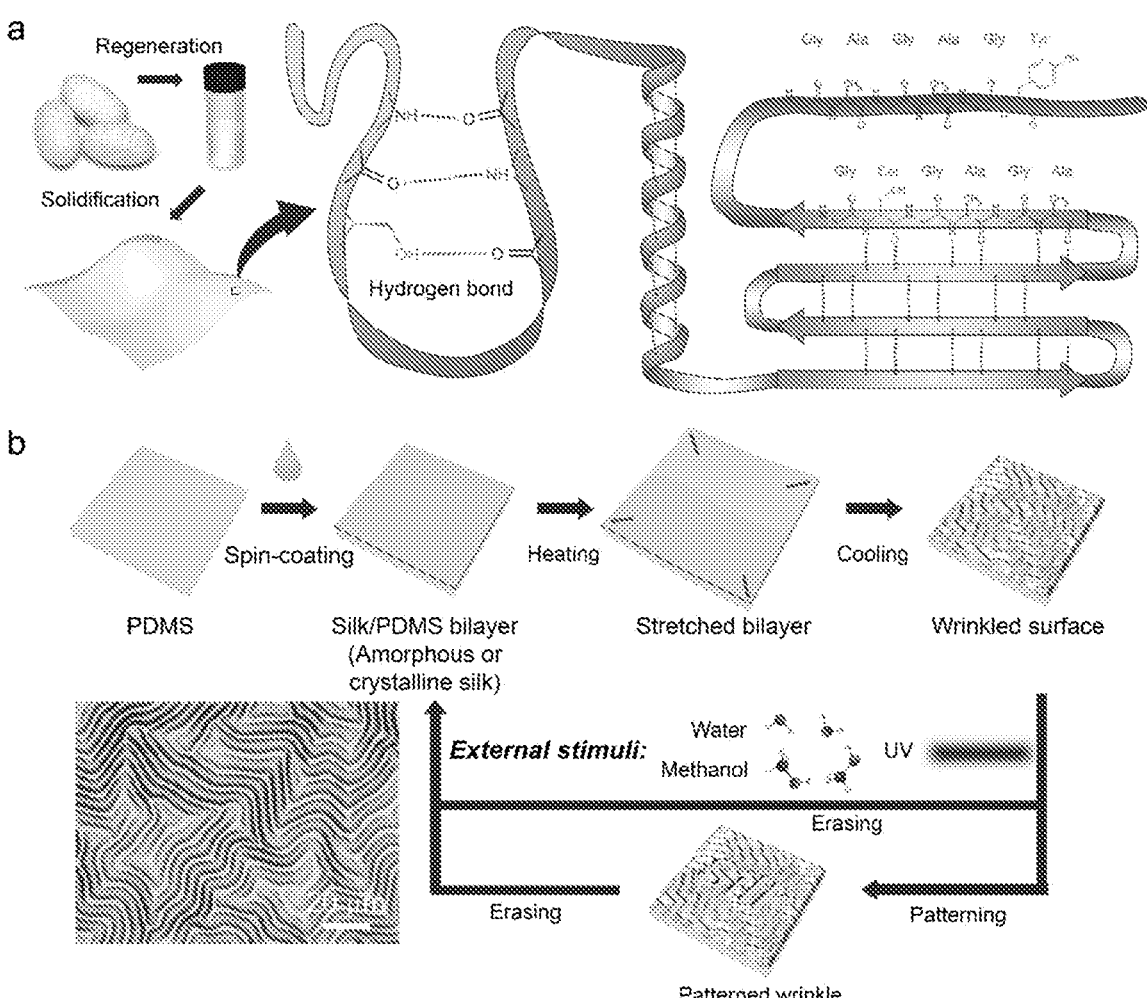

FIGS. 3*a*-3*b* are schematics illustrating an exemplary structure of silk fibroin and an exemplary fabrication process for a reversible wrinkle pattern. a. Schematic of reconstituted silk fibroin molecular chain showing the hydrogen bonding and secondary structures. b. Schematic of preparation of reversible wrinkle pattern. Optical-grade silk solution is spin-coated on a soft PDMS substrate to form silk/PDMS bilayer structure. Surface wrinkling is induced after heating and subsequent cooling process. The wrinkle is fully erased when it is entirely exposed to external stimulus such as water vapor, methanol vapor or UV light. Patterned wrinkle is generated by selective exposure through shadow masks and is completely eliminated by flood exposure. An optical microscopy image of a typical wrinkling surface is also shown.

FIGS. 4*a*-4*i* demonstrate wrinkle evolution behavior induced by water vapor (WV), methanol vapor (MV), and UV light exposure. A.-C. Wrinkle erasure induced by WV exposure. a. AFM images showing the reversible wrinkling/de-wrinkling process. b. Evolution of transmittance from wrinkled state to wrinkle-free state of amorphous and crystalline silk-based bilayers. c. The transmittance variation upon 50 heating & cooling/WV cycles. d-f. Wrinkle evolution induced by MV exposure. d. AFM images of the erasure process of amorphous silk-based wrinkle pattern. e. Corresponding time dependence of amplitude A and wavelength λ. F. Dependence of transmittance on the exposure time of amorphous and crystalline silk-based bilayers. g-i. Wrinkle evolution induced by UV exposure. G. AFM images of the erasure process of amorphous silk-based wrinkle pattern. h. Corresponding time dependence of amplitude A and wavelength λ. i. Dependence of transmittance on the exposure time of amorphous and crystalline silk-based bilayers.

Figures 5A, 5B, 5C:
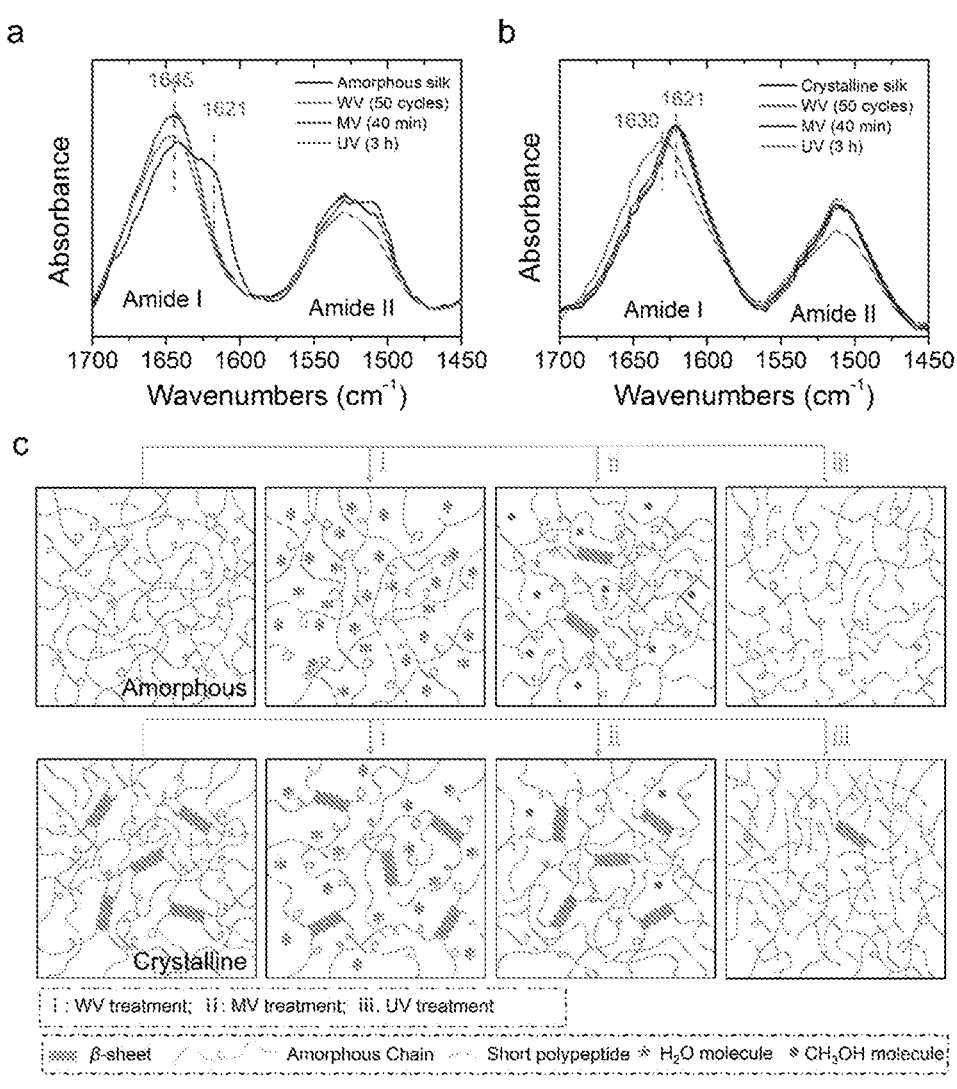

FIGS. 5a-5c demonstrate structural transitions during wrinkle erasure. a, FTIR spectra of amorphous silk before and after external stimuli. The spectrum after MV treatment for 40 min shows a shoulder peak at 1621 $cm^{-1}$, indicating the formation of β-sheet conformation. The amide I band is still centered at 1645 $cm^{-1}$ but the absorption peak decreases after UV exposure. b, FTIR spectra of crystalline silk before and after external stimuli. The absorption peak in amide I band shifts from 1621 $cm^{-1}$ to 1630 $cm^{-1}$ after UV light treatment, indicating the transition from β-sheet to random coil. c, Schematic of silk fibroin modifications induced by WV, MV, and UV light. Top row: amorphous silk; bottom row: crystalline silk.

Figures 6A, 6B:
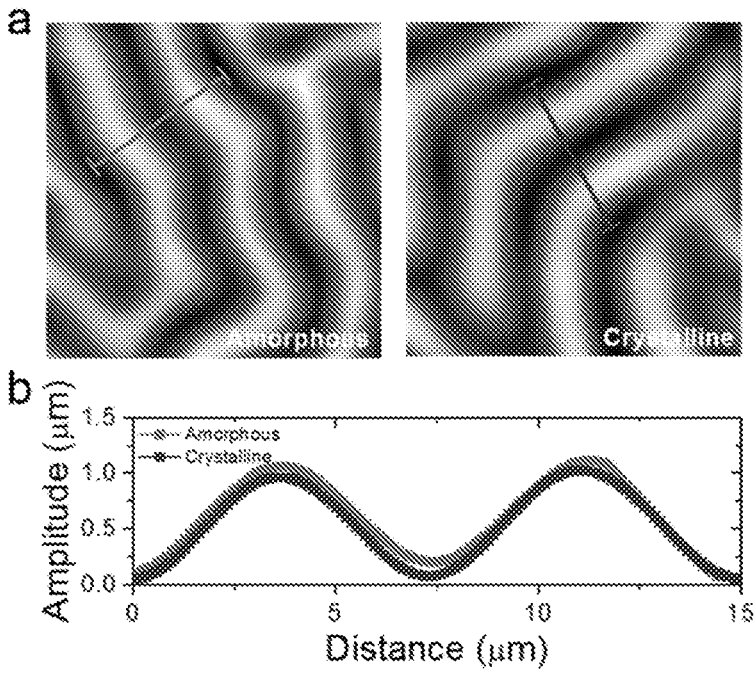

FIGS. 6a-6b demonstrate wrinkling surface with different silk conformation. a, AFM images of the wrinkling surface formed with amorphous silk (left) and crystalline silk (right). b, The cross-sectional profiles measured along the line illustrated in the corresponding AFM images.

FIGS. 7a-7e demonstrates variation of transmittance spectra induced by WV, MV, and UV exposure. a, The variation of transmittance spectra during wrinkling/de-wrinkling cycles induced by WV exposure. b-e, The variation of transmittance spectra of amorphous silk (b, d) and crystalline silk (c, e) based wrinkled structures after MV (b, c) or UV (d, e) treatment for denoted time.

Figures 8A, 8B:
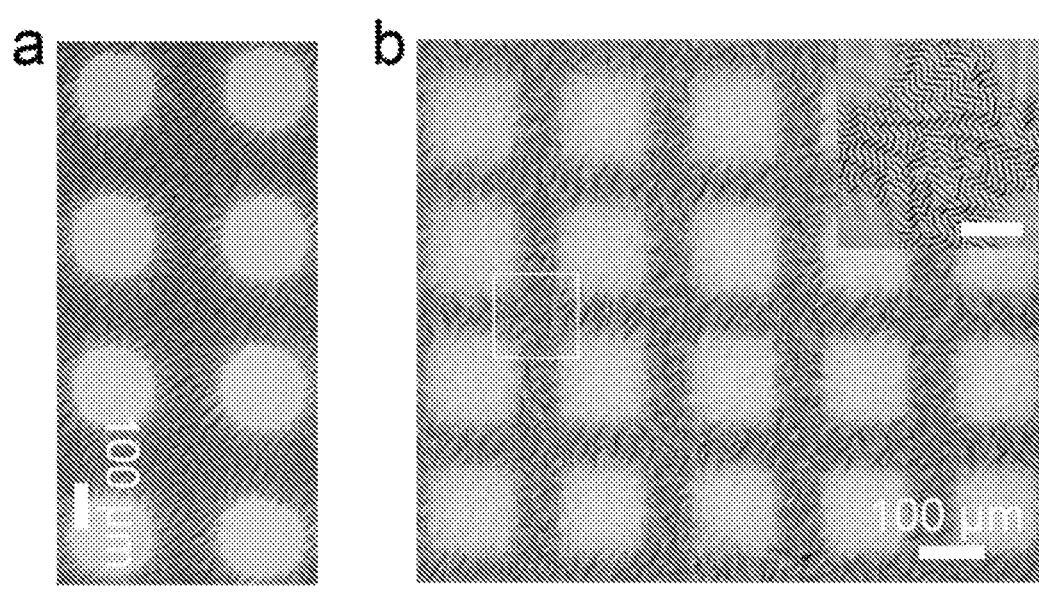

FIGS. 8a-8b present optical microscopy images of WV (a) and UV (b) patterned wrinkling surface. The insert in (b) is the enlarged image of the indicated rectangular area, showing randomly arranged wrinkle patterns between erased regions.

Figures 9A, 9B:
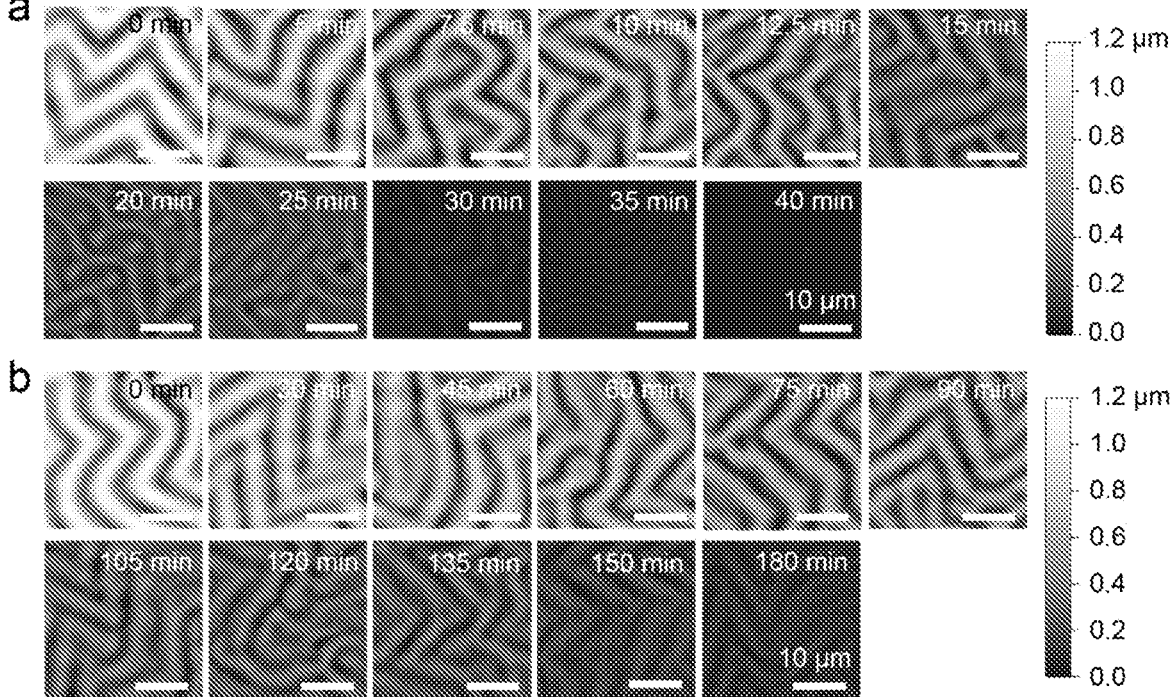

FIGS. 9a-9b demonstrate AFM images of an erasure process of amorphous silk-based wrinkling patterns induced by MV (a) and UV (b) exposure.

FIGS. 10a-10e demonstrate the use of silk-based dynamic wrinkle pattern for information strategies. a, Flow chart for the reversible preparation of patterned wrinkling surface by WV through using a shadow mask (left) and water ink through inkjet printing (right) and the corresponding digital photographs. The insert is the enlarged microscopy image of the indicated rectangular area, showing the clear boundary between wrinkled and smooth area. b, (top) Flow chart for the preparation of a MV-responsive encryption device. (bottom) Responsive behavior of the encryption device upon MV treatment. c. (top) Flow chart for the collection and extraction of fingerprint. (bottom) The hidden fingerprint can be reversibly revealed through wrinkling/de-wrinkling cycle. The enlarged microscopy image shows the formation of oriented wrinkle structure in the fingerprinted region. d. (left) Schematic of the formation of rhodamine B and quantum dots functionalized silk solutions. (right) Photographs of flat and wrinkled bilayers under 365 nm UV illumination, which are captured with the direction vertical (top view) or inclining (side view) to the sample surface. The enlarged images are the corresponding confocal images. e, Photographs of patterned wrinkles obtained under natural light (left) and UV light (right) illumination.

Figure 11:
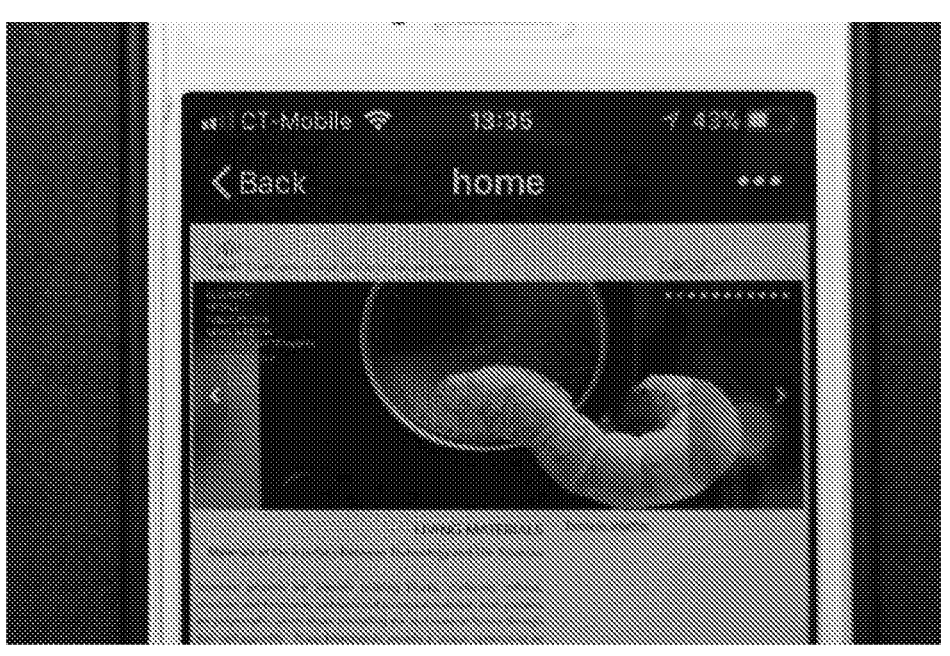

FIG. 11 presents the scanned result of the QR code inkjet-printed on wrinkling surface showing the homepage of Silklab in Tufts University.

Figure 12:
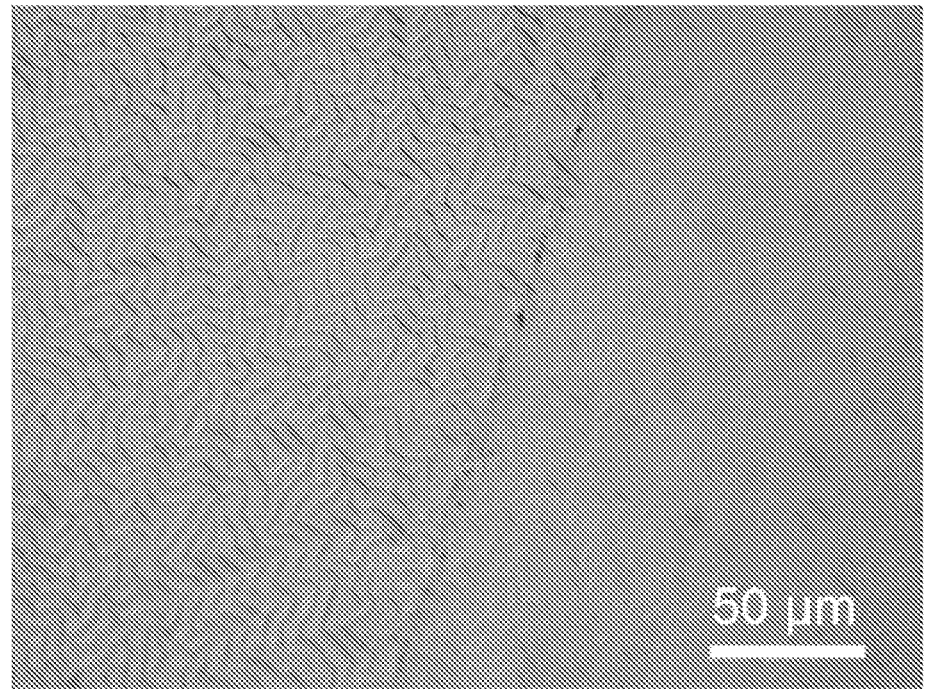

FIG. 12 is an optical microscopy image of the edge of the "Silk" pattern showing wrinkles remaining in the UV exposed area after MV treatment for 30 minutes.

Figure 13:
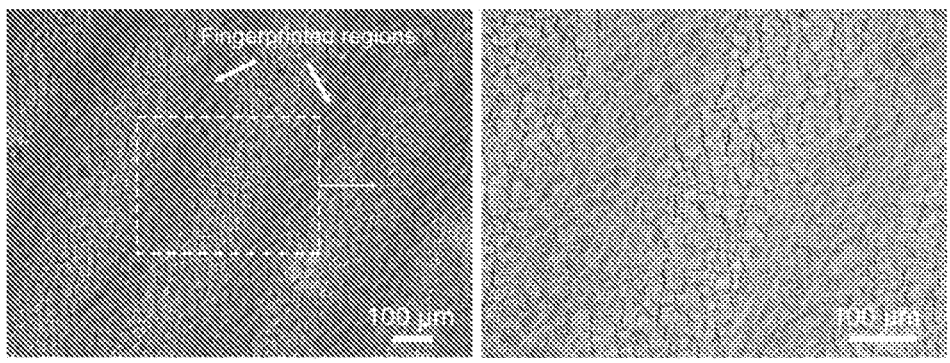

FIG. 13 presents optical microscopy images of the wrinkling surface after fingerprinting process.

Figures 14A, 14B:
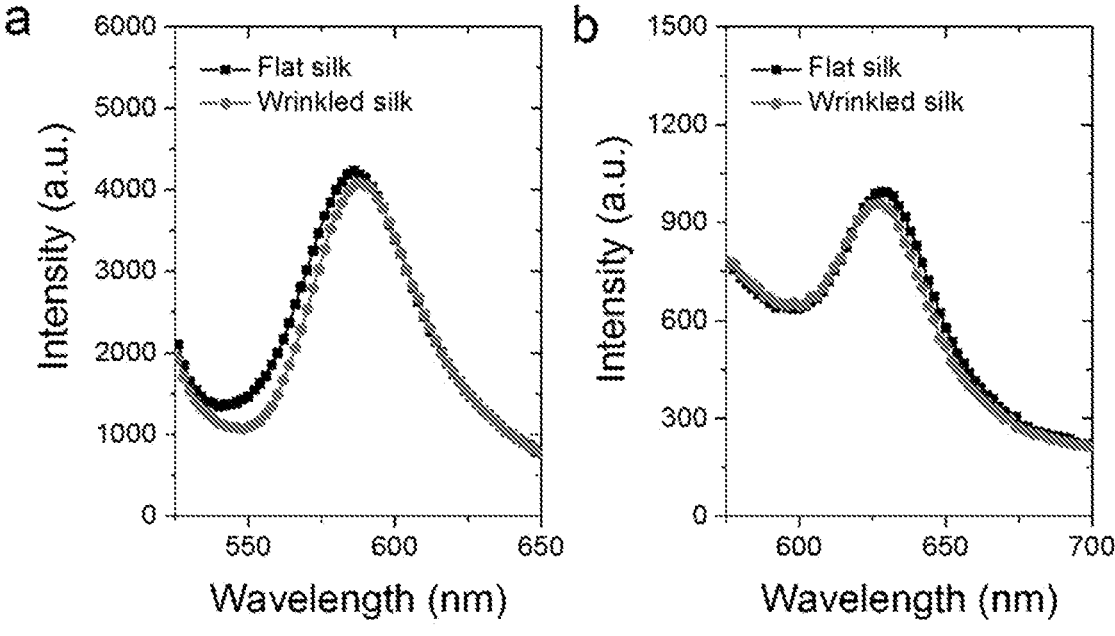

FIGS. 14a-14b demonstrate emission profiles of RhB (a) and QD (b) doped silk-based bilayer system recorded by exciting at 490 nm, respectively.

Figures 15A, 15B, 16A, 16B, 16C, 16D, 16E, 16F, 16G, 16H, 16I:
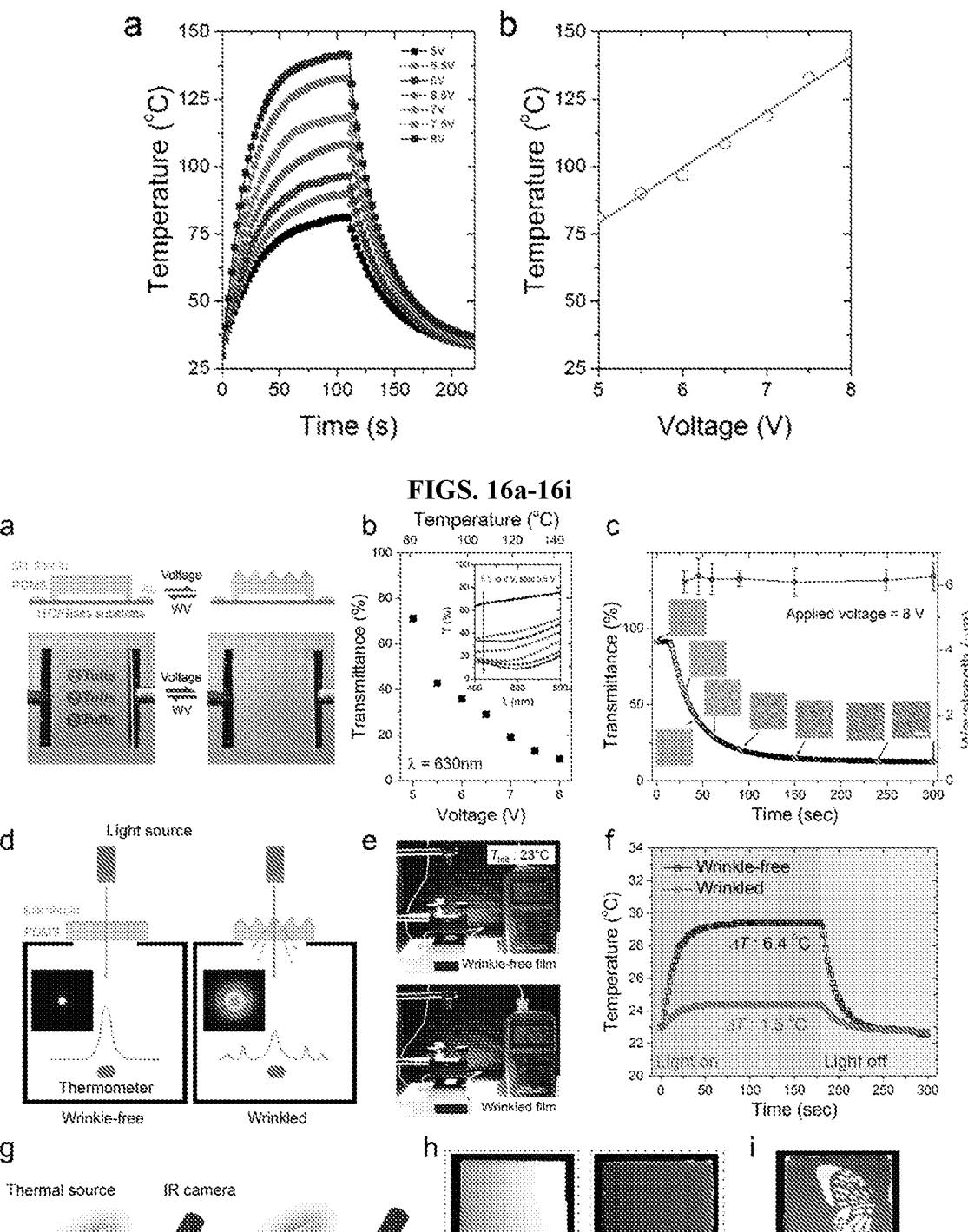

FIGS. 15a-15b demonstrate heating performance of ITO heater under different voltages. a, The evolution of temperature as a function of time. b, Dependence of final temperature of the heater on the applied voltage.

FIGS. 16a-16i demonstrate use of silk-based dynamic wrinkle pattern for optical and thermal management. a, (top) Schematics of electricity-responsive dynamic wrinkling system. (bottom) Photographs showing the switchable transparency. The Tufts University logos are underlying the device. b, Dependence of transmittance at 630 nm on input voltage and corresponding temperature. Insert shows the transmittance spectra under different voltages. c, The evolution of transmittance and wavelength during the wrinkle formation after cessation of the voltage. Inserts are the optical microscopy images showing the development of wrinkle. d, Schematics of temperature measurement when a white light beam passes through the wrinkle-free (left) or wrinkled (right) sample. Inserts indicate the projected diffraction patterns. e, The experimental setup for temperature measurement. The thermometer shows the final temperature in the central light spot. f. Temperature variation in white light on/off switch. g, Schematics of an aluminum-modified infrared-reflecting device with wrinkle-free (left) and wrinkled (right) surface under a constant thermal flux, illustrating the change in the reflection of infrared light. h. Photographs (top) and infrared camera images (bottom) of the infrared-reflecting system with wrinkle-free (left) or wrinkled (right) structure. i. Photograph (top) and infrared camera image (bottom) of the system with patterned wrinkle structure.

DETAILED DESCRIPTION

Before the present invention is described in further detail, it is to be understood that the invention is not limited to the particular embodiments described. It is also understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

Specific compositions, methods, and systems relating to silk-based wrinkled materials are disclosed. It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of"

those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

It should be appreciated that compositions that undergo some chemical transformation during their use can be described in various ways. In the present disclosure, components of chemical compositions can be described either as the form they take prior to any chemical transformation or the form they take following the chemical transformation. If there is any ambiguity to a person having ordinary skill in the art, the assumption should be that the component is being described in the context of the particular composition being described (i.e., if describing a finished product or an intermediary after a given chemical transformation, then the chemically transformed entity is being described, and if describing a starting product or intermediary prior to the chemical transformation, then the untransformed entity is being described.

The present disclosure relates at least in part on the inventors development of a fabrication process to produce reversible, multi-responsive wrinkling micropatterns using silk fibroin. As described herein, the wrinkle structures can be dynamically tuned and erased easily using processes that comprise the controlled exposure of silk fibroin to an external stimulus or stimuli including, but not limited to, water vapor (WV), methanol vapor (MV), or UV irradiation, which can induce controllable structural transitions of the silk protein. The advantages of using silk protein as to prepare responsive patterned materials are multifold and include, without limitation, (i) that the response of the wrinkling system to external stimuli is dominated by the silk conformational transition; (ii) multiple and tunable responsive wrinkle patterns can be obtained by virtue of the polymorphic nature of silk; (iii) the high sensitivity of silk protein to water molecules allows rapid erasure of a wrinkle pattern (e.g., in some cases less than 1 second); (iv) water vapor (WV)-based processing of silk makes it easy to functionalize the material and add new layers of functions to the wrinkling system; (v) WV-based tuning of silk-based wrinkling surfaces permits interfacing tunable optics with biological environments; and (vi) silk-based wrinkling surfaces are immune to most of organic solvents, making them particularly useful as templates for device design.

The present teachings relate to methods of manipulating a layered composition, where the composition comprises a polymeric protein layer and a flexible polymer layer, to produce reversible wrinkles on a surface of the protein layer. Preferably, the polymeric protein layer comprises silk fibroin protein. As used here, the term "wrinkle" may refer to a fold or crease in a substrate or on a surface of a substrate. As used herein, the term "reversible wrinkles" may refer to folds or creases that are temporarily fixed after formation and are present on the polymeric protein layer upon exposure to certain external stimuli, but can be removed or "erased" in the presence of other particular stimuli (or in the absence or particular stimuli). While the present disclosure illustrates and describes two layered (bilayered) structures, it is understood that any other numbers of layers, including a single layer, are within the scope of the present teachings. As non-limiting examples, silk-based layered compositions and systems including three, six, eighteen, or seventy-five full or partial layers, including all intermediary values, are within the scope of the present teachings.

In an aspect, the present disclosure provides a reversible silk-based wrinkled composition. The wrinkled composition is silk-based layered composition (e.g., bilayer) comprising a silk protein polymeric component on a flexible polymer component. By controlling the crystallinity of the silk protein polymeric component, one may change its conformation on the micro- or nanoscale. For example, the application of an external thermal stimulus to the bilayer composition can induce surface wrinkling of the protein polymeric component with labyrinth-like morphology because of the two materials' mechanical mismatch. A non-limiting description of the formation of reversible surface wrinkles in a silk bilayer composition is provided below in Example 1.

In some cases, the silk-based wrinkled composition is obtained according to a method comprising the following steps: applying a silk fibroin solution to a flexible polymer substrate to form a layered structure comprising a silk fibroin layer and a flexible polymer layer; heating the layered structure, whereby the layered structure expands in response to heat stimulus; and cooling the heated layered structure to form reversible wrinkles on a surface on the silk fibroin layer.

Silk fibroin is a particularly appealing biopolymer candidate to be used for various embodiments described herein, e.g., because of its versatile processing e.g., all-aqueous processing (Sofia et al., 54 *J. Biomed. Mater. Res.* 139 (2001); Perry et al., 20 *Adv. Mater.* 3070-72 (2008)), relatively easy functionalization (Murphy et al., 29 *Biomat.* 2829-38 (2008)), and biocompatibility (Santin et al., 46 *J. Biomed. Mater. Res.* 382-9 (1999)). For example, silk has been approved by U.S. Food and Drug Administration as a tissue engineering scaffold in human implants. See Altman et al., 24 *Biomaterials:* 401 (2003).

As used herein, the term "silk fibroin" refers to silk fibroin protein whether produced by silkworm, spider, or other insect, or otherwise generated (Lucas et al., Adv. Protein Chem., 13: 107-242 (1958)). Any type of silk fibroin can be used in different embodiments described herein. Silk is naturally produced by various species, including, without limitation: *Antheraea mylitta; Antheraea pernyi; Antheraea yamamai; Galleria mellonella; Bombyx mori; Bombyx mandarina; Galleria mellonella; Nephila clavipes; Nephila senegalensis; Gasteracantha mammosa; Argiope aurantia; Araneus diadematus; Latrodectus geometricus; Araneus bicentenarius; Tetragnatha versicolor; Araneus ventricosus; Dolomedes tenebrosus; Euagrus chisoseus; Plectreurys tristis; Argiope trifasciata;* and *Nephila madagascariensis.* Silk fibroin produced by silkworms, such as *Bombyx mori,* is the most common and represents an earth-friendly, renewable resource. For instance, silk fibroin used in a silk film may be attained by extracting sericin from the cocoons of *B. mori.* Organic silkworm cocoons are also commercially available. There are many different silks, however, including spider silk (e.g., obtained from *Nephila clavipes*), transgenic silks, genetically engineered silks, such as silks from bacteria, yeast, mammalian cells, transgenic animals, or transgenic plants, and variants thereof, that can be used. See, e.g., WO 97/08315 and U.S. Pat. No. 5,245,012, each of which is incorporated herein as reference in its entirety.

Silk materials explicitly exemplified herein were typically prepared from material spun by silkworm, *Bombyx mori.* Typically, cocoons are boiled in an aqueous solution of 0.02 M Na2 CO3, then rinsed thoroughly with water to extract the glue-like sericin proteins (this is also referred to as "degumming" silk). Extracted silk is then dissolved in a solvent, for example, LiBr (such as 9.3 M) solution at room temperature.

A resulting silk fibroin solution can then be further processed for a variety of applications as described elsewhere herein.

In some embodiments, polymers of silk fibroin fragments can be derived by degumming silk cocoons at or close to (e.g., within 5% around) an atmospheric boiling temperature for at least about: 1 minute of boiling, 2 minutes of boiling, 3 minutes of boiling, 4 minutes of boiling, 5 minutes of boiling, 6 minutes of boiling, 7 minutes of boiling, 8 minutes of boiling, 9 minutes of boiling, 10 minutes of boiling, 11 minutes of boiling, 12 minutes of boiling, 13 minutes of boiling, 14 minutes of boiling, 15 minutes of boiling, 16 minutes of boiling, 17 minutes of boiling, 18 minutes of boiling, 19 minutes of boiling, 20 minutes of boiling, 25 minutes of boiling, 30 minutes of boiling, 35 minutes of boiling, 40 minutes of boiling, 45 minutes of boiling, 50 minutes of boiling, 55 minutes of boiling, 60 minutes or longer, including, e.g., at least 70 minutes, at least 80 minutes, at least 90 minutes, at least 100 minutes, at least 110 minutes, at least about 120 minutes or longer. As used herein, the term "atmospheric boiling temperature" refers to a temperature at which a liquid boils under atmospheric pressure.

In some embodiments, silk fibroin fragments may be of any application-appropriate size. For example, in some embodiments, silk fibroin fragments may have a molecular weight of 200 kDa or less (e.g., less than 125 kDa, 100 kDa, 75 kDa, 50 kDa). Without wishing to be held to a particular theory, it is contemplated that the size of silk fibroin fragments may impact gelation time and rate of crosslinking. By way of specific example, in some embodiments, use of silk fragments of a relatively low molecular weight (e.g., less than 200 kDa) may result in relatively more rapid crosslinking due, at least in part, to the greater mobility of the available chains for reacting in a crosslinking step.

In some embodiments, hydrogels of the present invention produced from silk fibroin fragments can be formed by degumming silk cocoons in an aqueous solution at temperatures of: about 30° C., about 35° C., about 40° C., about 45° C., about 50° C., about 45° C., about 60° C., about 65° C., about 70° C., about 75° C., about 80° C., about 85° C., about 90° C., about 95° C., about 100° C., about 105° C., about 110° C., about 115° C., about at least 120° C.

In some embodiments, the properties of provided compositions may be modulated by controlling a concentration of silk fibroin. In some embodiments, a weight percentage of silk fibroin can be present in a solution at any concentration suited to a particular application. In some embodiments, an aqueous silk fibroin solution (or a provided composition, for example, a provided silk fibroin layer or bilayer) can have silk fibroin at a concentration from 0.1 wt % to 95 wt %, from 0.1 wt % to 75 wt %, or from 0.1 wt % to 50 wt %.

In some embodiments, a weight percent of silk in solution (or a provided composition herein, for example, a silk fibroin layer or bilayer) is at least 0.1 wt %, or is at least 0.5 wt %, or is at least 1 wt %, is at least 1.5 wt %, is at least 2 wt %, is at least 2.5 wt %, is at least 3 wt %, is at least 3.5 wt %, is at least 4 wt %, is at least 5 wt %, is at least 5.5 wt %, is at least 6 wt %, is at least 6.5 wt %, is at least 7 wt %, is at least 7.5 wt %, is at least 8 wt %, is at least 8.5 wt %, is at least 9 wt %, is at least 9.5 wt %, or is at least 10 wt %, based on the total weight of the silk solution or the provided composition. In some embodiments, a weight percent of silk in solution (or a provided composition herein) is less than 10 wt %, is less than 11 wt %, is less than 12 wt %, is less than 13 wt %, is less than 14 wt %, is less than 15 wt %, is less than 16 wt %, is less than 17 wt %, is less than 18 wt %, is less than 19 wt %, is less than 20 wt %, is less than 21 wt %, is less than 22 wt %, is less than 23 wt %, is less than 24 wt %, is less than 25 wt %, or is less than 30 wt %.

In some embodiments, the silk fiber can be an unprocessed silk fiber, e.g., raw silk or raw silk fiber. The term "raw silk" or "raw silk fiber" refers to silk fiber that has not been treated to remove sericin, and thus encompasses, for example, silk fibers taken directly from a cocoon. Thus, by unprocessed silk fiber is meant silk fibroin, obtained directly from the silk gland. When silk fibroin, obtained directly from the silk gland, is allowed to dry, the structure is referred to as silk I in the solid state. Thus, an unprocessed silk fiber comprises silk fibroin mostly in the silk I conformation (a helix dominated structure). A regenerated or processed silk fiber on the other hand comprises silk fibroin having a substantial silk II (a β-sheet dominated structure).

It has been observed that the beta-sheets of fibroin proteins stack to form crystals, whereas the other segments form amorphous domains. It is the interplay between the hard crystalline segments and the strained elastic semi amorphous regions that gives silk its extraordinary properties. Inducing a conformational change in silk fibroin can facilitate formation of a solid-state silk fibroin and/or make the silk fibroin at least partially insoluble. Further, inducing formation of beta-sheet conformation structure in silk fibroin can prevent silk fibroin from contracting into a compact structure and/or forming an entanglement. In some embodiments, a conformational change in the silk fibroin can alter the crystallinity of the silk fibroin in the silk particles, such as increasing crystallinity of the silk fibroin, e.g., silk II β-sheet crystallinity. In some embodiments, the conformation of the silk fibroin in the silk fibroin foam can be altered after formation.

As a structural protein, silk fibroin undergoes conformational transition when triggered by external stimuli, such as water vapor, methanol, or deep UV light. Referring to FIG. 3A, such external stimuli can affect hydrogen bonding between protein chains and induce β-sheet structure formation, consequently converting a water soluble material into a water insoluble format. Further, ultraviolet radiation is able to induce photodegradation of silk fibroin at weaker C—N bonds, thereby inducing a considerable decrease in the protein's degree of crystallinity. This polymorphic transition of silk fibroin is central to the control of the molecular chain movement at the nanoscale, offering the possibility to controllably tune the pattern morphology of the material.

Referring to FIG. 3B, in some cases, the method for producing creating a reversible patterned wrinkle surface comprises applying a silk fibroin solution to a flexible polymer substrate to form a layered (e.g., bilayered) structure comprising a silk fibroin layer and a flexible polymer layer; heating the layered structure, whereby the bilayer structure expands in response to heat stimulus; and cooling the heated layered structure to form surface wrinkling on the silk fibroin layer.

In some embodiments, heating of the layered structure is performed at a temperature of: about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., or about at least 150° C.

It will be understood that the heating temperature is at least in part dictated by the thermodynamic sensitivity of the material of each layer and the differential between layers in contact with each other. Without wishing to be bound by any particular theory or mechanism, the formation of surface wrinkles in the bilayer system can be explained based on linear bulking theory. The modulus mismatch between the silk film and the PDMS substrate leads to the generation of in-plane compression strain ε upon cooling. Surface wrinkles form when ε exceeds the critical compression strain $\varepsilon_c$. Here, $\varepsilon_c$ is determined by the bilayer properties and can be given as follows[27]:

$$\varepsilon_c = \frac{1}{4}\left(\frac{\overline{E_s}}{\overline{E_f}}\right)^{\frac{2}{3}} \tag{1}$$

where $\overline{E_f}$ and $\overline{E_s}$ are the plane-strain moduli of silk and PDMS, respectively. The plane strain modulus is shown as $\overline{E}=E/(1-v^2)$, where E is the Young's modulus, and v is the Poisson's ratio. The critical wrinkling wavelength λ, and the amplitude A, can be described by[27]:

$$\lambda = 2\pi t_f\left(\frac{\overline{E_f}}{3\overline{E_s}}\right)^{\frac{1}{3}} \quad A = t_f\sqrt{\frac{\varepsilon - \varepsilon_c}{\varepsilon_c}} \tag{2}$$

where $t_f$ is the thickness of silk film, ε is the applied compressive strain.

Figures 2A, 2B, 2C, 2D, 2E:
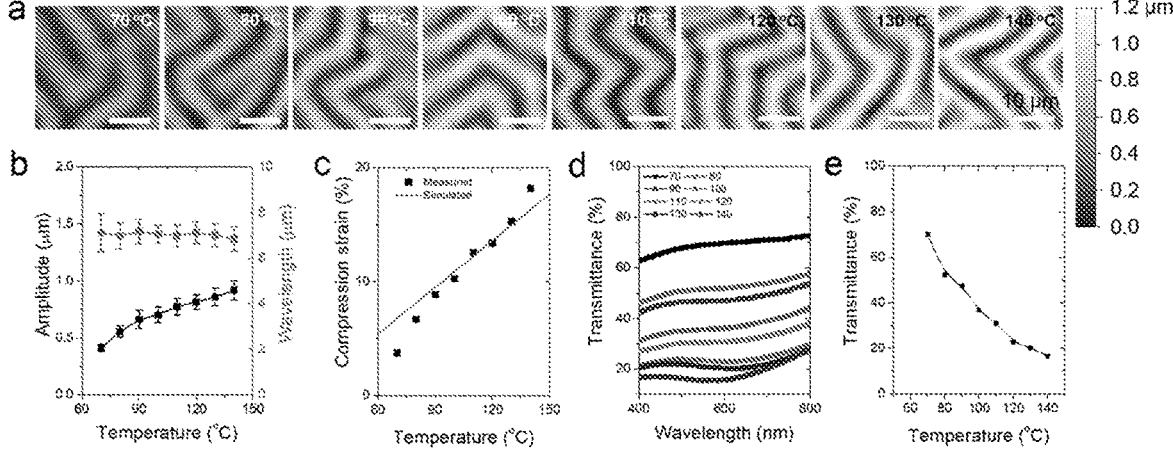

As expected from equation (2), the λ and A of the resulting wrinkles linearly correlated with the $t_f$, as shown in FIGS. 1b, 1c. According to the equations above (and FIG. 1b), $\overline{E_f}$ is estimated to be 2.14 GPa (if $\overline{E_s}$=1.5 MPa), which is consistent with the previously reported value,[46] while $\varepsilon_c$ can be estimated to be ~0.41%. Finally, the development of wrinkle structures under different heating temperatures was evaluated. With the increase of heating temperature, the wrinkle amplitude A was found to gradually increase while λ remains largely unchanged (FIG. 2b), owing to the dependence of A on the applied compressive strain ε as shown in equation (2). The compressive strain can be calculated as:

$$\varepsilon = (\alpha_s - \alpha_f) \times \Delta T \tag{3}$$

where $\alpha_s$ as and $\alpha_f$ are the linear thermal expansion coefficients of PDMS and silk, respectively, and ΔT represents the temperature variation. Here, $\alpha_s \approx 0.3 \times 10^{-3}/^\circ$ C., $\alpha_f \approx -1.06 \times 10^{-3}/^\circ$ C.[47] and the initial temperature is 20° C. The dependence of the calculated compressive strain ε on the heating temperature is found to be consistent with the predicted values (FIG. 2c).

The formation of a wrinkled surface can induce the change of direct light transmittance due to its enhanced capacity for light diffusion. After testing the transmittance of the silk/PDMS bilayer system with different silk film thickness, we found that the transmittance decreases largely first and then increases slightly with the increase of the thickness (FIGS. 1d and 1e). Furthermore, the increase of amplitude A with the temperature brings out the gradual decrease of the transmittance (FIGS. 2d and 2e).

In various embodiments, the silk fibroin can be modified for different applications and/or desired mechanical or chemical properties (e.g., to facilitate formation of a gradient of active agent in silk fibroin layer). One of skill in the art can select appropriate methods to modify silk fibroins, e.g., depending on the side groups of the silk fibroins, desired reactivity of the silk fibroin and/or desired charge density on the silk fibroin. In one embodiment, modification of silk fibroin can use the amino acid side chain chemistry, such as chemical modifications through covalent bonding, or modifications through charge-charge interaction. Exemplary chemical modification methods include, but are not limited to, carbodiimide coupling reaction (see, e.g. U.S. Patent Application. No. US 2007/0212730), diazonium coupling reaction (see, e.g., U.S. Patent Application No. US 2009/0232963), avidin-biotin interaction (see, e.g., International Application No.: WO 2011/011347) and pegylation with a chemically active or activated derivatives of the PEG polymer (see, e.g., International Application No. WO 2010/057142). Silk fibroin can also be modified through gene modification to alter functionalities of the silk protein (see, e.g., International Application No. WO 2011/006133). For instance, the silk fibroin can be genetically modified, which can provide for further modification of the silk such as the inclusion of a fusion polypeptide comprising a fibrous protein domain and a mineralization domain, which can be used to form an organic-inorganic composite. See WO 2006/076711. Additionally, the silk fibroin matrix can be combined with a chemical, such as glycerol, that, e.g., affects flexibility of the matrix. See, e.g., WO 2010/042798, Modified Silk films Containing Glycerol.

In some embodiments, the silk fibroin can be also mixed with other biocompatible and/or biodegradable polymers to form mixed polymer particles comprising silk fibroin. One or more biocompatible and/or biodegradable polymers (e.g., two or more biocompatible polymers) can be added to the silk fibroin solution. The biocompatible polymer that can be used herein include, but are not limited to, polyethylene oxide (PEO), polyethylene glycol (PEG), collagen, fibronectin, keratin, polyaspartic acid, polylysine, alginate, chitosan, chitin, hyaluronic acid, pectin, polycaprolactone, polylactic acid, polyglycolic acid, polyhydroxyalkanoates, dextrans, polyanhydrides, polymer, PLA-PGA, polyanhydride, polyorthoester, polycaprolactone, polyfumarate, collagen, chitosan, alginate, hyaluronic acid and other biocompatible and/or biodegradable polymers. See, e.g., International Application Nos.: WO 04/062697; WO 05/012606.

Casting of the silk layer can be performed by using any known means, e.g. a spin-coating method, where the silk solution is spin coated onto a substrate to allow the fabrication of thin membranes of non-uniform or uniform height; or simply by pouring silk fibroin solution over the top of a substrate. In some cases, a single layer or multiple layers of silk films are casted on the substrate. In some cases, the bilayer composition is prepared by spin-coating a thin layer of silk fibroin film onto soft polydimethylsiloxane (PDMS) substrate.

The thickness of the silk matrix, e.g. silk layer, can be controlled by changing the concentration and/or volume of the silk solution. In one embodiment, the thickness of a silk layer can be controlled by changing the concentration and/or volume of the silk solution deposited on the substrate. The resulting silk layer can range from, for example, 1 nm to 1 mm thick. In some embodiments, the layer thickness can be in a centimeter range, e.g., at least about 0.1 cm, at least about 0.5 cm, at least about 1 cm, at least about 2 cm, at least about 5 cm, at least about 10 cm or thicker. In some embodiments, the layer thickness can be reduced to a micro- or nano-meter range, e.g., at least about 1 nm, at least about 5 nm, at least about 10 nm, at least about 50 nm, at least about 100 nm, at least about 500 nm, at least about 1 μm at least about 5 μm, at least about 10 μm, at least about 25 μm, at least about 50 μm, at least about 100 μm, at least about 300 μm, at least about 500 μm, or at least about 1000 μm. In one embodiment, the film thickness ranges from about 1 nm to about 1000 nm. In another embodiment, the film thickness ranges from about 1 nm to about 300 μm.

The thickness of the silk layers can be controlled by depositing different numbers of silk layers. Suitable processes for preparing silk films are disclosed in, for example WO 2005/012606, WO/2006/042287, and WO/2007/016524. Alternatively, the silk fibroin solution can be spin-coated on a substrate using various concentrations and spin speeds to produce films or layers from about 1 nm to about 300 μm, from about 1 nm to 500 nm, or from 1 nm to about 200 nm. In some cases, the silk layer is formed with silk thickness of about 147 nm. In general, thinner silk fibroin layers are preferred as they tend to exhibit excellent surface quality and optical transparency. In preferred embodiments, the silk fibroin layer is a monolayer having a thickness up to about 300 μm.

The flexible polymer component can be formed from components including, without limitation, polydimethylsiloxane (PDMS), cyclic olefin copolymer (COC), poly(methyl methacrylate) (PMMA), polycarbonates (PC), poly-propylenes (PP), polystyrenes (PS), polyvinylchloride (PVC), perflouropolyether (PFPE), polyurethanes, poly(ethylene terephthalate) (PET), polyesters, and the like, and combinations comprising at least one of the foregoing polymer components. It is understood that a blend of polymers, branched polymers, and polymers with side chains are also part of the present teachings. The flexible polymer layer can have a thickness in the range of, for example, 1 nm to 1000 μm. In some embodiments, the polymer layer thickness can be reduced to a micro- or nano-meter range, e.g., about 1 nm, at least about 5 nm, at least about 10 nm, at least about 50 nm, at least about 100 nm, at least about 500 nm, at least about 1 μm, at least about 5 μm, at least about 10 μm, at least about 25 μm, at least about 50 μm, at least about 100 μm, at least about 300 μm, at least about 500 μm, or at least about 1000 μm. In some embodiments, the polymer layer has a thickness ranging from about 1 nm to about 1000 nm. In another embodiment, the film thickness ranges from about 1 nm to about 300 μm. In some embodiments, the flexible polymer component is a monolayer having a thickness up to about 300 μm.

In some cases, at least a portion of the wrinkled silk layer surface is exposed to an erasing agent to remove surface wrinkling from the exposed portion, thereby forming a patterned wrinkle. As used herein, an "erasing agent" is an agent that partially or completely removes wrinkles (folds, creases) from the surface of a silk-based wrinkled composition and includes, without limitation, methanol vapor (MV), water vapor (WV), or ultraviolet (UV) light. As demonstrated in Example 1, the wrinkling and wrinkle erasing processes are reversible and can be repeated many times. It will be appreciated that, as thickness of the silk and/or polymer layer increases, the time of exposure to a wrinkling agent (e.g., heat) or an erasing agent also increases. In other words, the dynamics of wrinkle change (e.g., creating wrinkles, removing wrinkles) vary depending on the thickness of each layer of the layered structure.

In some cases, removing (erasing) wrinkles from a silk-based wrinkled material comprises exposing at least a portion of a wrinkled silk layer surface to methanol vapor (MV), water vapor (WV), or ultraviolet (UV) light for a length of time necessary to reduce or remove folds and creases (in whole or in part) from the silk layer surface. The wrinkle "erasing" process is fast and affected by the conformation of silk fibroin. When exposure to an erasing agent comprises exposure to water vapor, exposure times are about less than one second to about 5 seconds. In some embodiments, exposure times are less than 1 second, less than 2 seconds, less than 3 seconds, less than 4 seconds, less than 5 seconds, less than 6 seconds, less than 7 seconds, less than 8 seconds, less than 9 seconds, or about 10 seconds or less. When exposure to water vapor comprises dipping or immersing a layer structure in water, wrinkle erasure can be achieved almost instantaneously (e.g., in a fraction of a second). Water vapor exposure time can be longer than 10 seconds, but is ideally less than an exposure time that causes material dissolution.

As demonstrated in Example 1, exposure of an amorphous silk layer to water vapor for about 1 second is sufficient to transition the opaque wrinkled bilayer to transparency in its wrinkle-free state. Exposure of crystalline silk layer to water vapor for about 3 seconds is sufficient to transition the opaque wrinkled bilayer to transparency in its wrinkle-free state. Because the initial wrinkled bilayer is opaque and becomes transparent after wrinkle removal, wrinkle dynamics can be monitored by evaluating light transmittance through the system. In this manner, structural stability of the silk-based bilayer system enables a reversible and repeatable transition between the wrinkled and unwrinkled states over multiple cycles. Additionally, selective exposure to WV using shadow masking approaches permits the creation of defined patterns of wrinkled topographies.

In some embodiments, the silk layer and/or bilayer may be optically clear or transparent in the wrinkle-free state. The transparency of the silk layer and/or bilayer may be controlled by adjusting the exposure time of the external stimulus. In some embodiments, the silk layer may be visually clear with 70% to 95% visible light transmittance at 400 to 700 nm. In some embodiments, the silk layer in the wrinkle-free state may have at least 70% visible light transmittance, at least 75% visible light transmittance, at least 80% visible light transmittance, or at least 85% visible light transmittance. In some embodiments, the silk layer in the wrinkle-free state may have less than 90% visible light transmittance, less than 91% visible light transmittance, less than 92% visible light transmittance, less than 93% visible light transmittance, less than 94% visible light transmittance, or less than 95 visible light transmittance, e.g., at 400 to 700 nm.

In some embodiments, the silk layer and/or bilayer in the wrinkled state may have reduced visible light transmittance. In some embodiments, the transmittance of visible light through silk layer and/or bilayer in the wrinkled state may be tuned by exposing the wrinkled region to the external stimuli for a desired duration. In some embodiments, the silk layer and/or bilayer in the wrinkled state may have visible light transmittance values from 0% to 70%. In some embodiments, the silk layer and/or bilayer in the wirnkled state may have visible light transmittance values of less than 70%, or less than 60%, or less than 50%, or less than 40%, or less than 30%, or less than 20%, or less than 10%, or less than 5%, or less than 1%. In some embodiments, the silk layer and/or bilayer in the wrinkled state is optically opaque.

In some cases, removing (erasing) wrinkles from a silk-based wrinkled material comprises exposing at least a portion of a wrinkled silk layer surface to ultra violet (UV) light (also referred to herein as UV radiation). In some embodiments, deep ultra violet light induces peptide chain scission and photodegradation of silk fibroin. In some embodiments, peptide chain scission and photodegradation is initiated at weaker C—N bonds. In some embodiments, peptide chain scission and photodegradation leads to molecular rearrangement of silk fibroin. See, e.g., Shao et al., 96 *J. Appl. Polym.*

*Sci.,* 1999 (2005). In some cases, UV light exposure comprises exposure of the bilayer composition, or a portion thereof, to UV light in the wavelength range of 320 to 500 nm. In some embodiments, when exposure includes exposure to ultra violet radiation, exposure times are about 15 minutes to 5 hours. In some embodiments, exposure times are less than 15 minutes, less than 30 minutes, less than 45 minutes, less than 1 hour, less than 1.5 hours, less than 2 hours, less than 2.5 hours, less than 3 hours, less than 3.5 hours, less than 4 hours, less than 4.5 hours, less than 5 hours, less than 5.5 hours, less than 6 hours, less than 7 hours, less than 8 hours, less than 9 hours, less than 10 hours, or more. Light sources for exposure suitably applicable to the composition of the present invention include general purpose light source capable of emitting ultraviolet and visible light rays having wavelengths over 180 nm such as, for example, mercury discharge lamps, high pressure mercury lamps, xenon lamps, metal halide lamps, fluorescent lamps, tungsten lamps, argon ion laser, helium cadmium laser, krypton laser, ultraviolet (UV) light emitting diodes (LEDs), and the like. It will be understood that, as intensity of UV photons produced by the UV light source increases, the length of time of exposure to that UV light source required to achieve wrinkle removal decreases. For example, wrinkle removal is achieved more quickly using a higher intensity UV light source such as those suitable for UV LED-based lithography or deep-UV (short-wavelength range) lithography than with a conventional UV light source.

In some cases, a silk-based layered composition is exposed, in whole or in part, to water vapor or UV light prior to the formation of reversible wrinkles. For instance, macro- or micro-patterns can be produced by selectively applying water vapor or UV irradiation, for example through a stencil or shadow mask, prior to heating and cooling a silk-based layered composition to form reversible wrinkles on at least a portion of the silk layer surface.

In some cases, removing (erasing) wrinkles from a silk-based wrinkled material comprises exposing at least a portion of a wrinkled silk layer surface to methanol vapor. In some cases, such exposure comprises exposure of the wrinkled silk layer surface to methanol vapor. In some cases, the MV exposure time is about 1 minute to about 120 minutes, depending on the initial crystalline state of the protein layer. As demonstrated in Example 1, the wrinkle spacing $\lambda$ in amorphous silk-based wrinkle patterns stays mostly constant while the amplitude A decreases dramatically with the exposure time leading to surface flattening.

Selective exposure to an erasing agent permits the creation of defined patterns of wrinkled topographies. For example, a defined micropattern or nanopattern of wrinkles can be achieved by masking a certain region or regions of a silk-based wrinkled material, thereby preventing exposure of those regions to the methanol vapor (MV), water vapor (WV), or ultraviolet (UV) light.

In some cases, a defined wrinkle pattern (e.g., defined micropattern, defined nanopattern) is established using a shadow mask patterning technique. A shadow mask can be attached to the silk layer. In some embodiments, the shadow mask can be accurately positioned and/or fixed relative to the silk layer via alignment under microscopy. In some embodiments, the shadow mask can be contact-positioned on a silk layer, e.g., the shadow mask can be placed in contact with silk layer and aligned and/or positioned without use of adhesives. In some embodiments, clamps and/or clips can secure contact between the shadow mask and the silk layer. In some embodiments, the edges of the shadow mask can be attached to the silk layer with tapes, by way of example. In other cases, a patterned mask is spray-deposited on a surface of a silk layer. In another example, a patterned mask can be transferred by contact from a substrate to a surface of a silk layer. In some embodiments, a patterned mask can be embedded in a silk layer. For example, a patterned mask can be formed on a substrate, and a silk fibroin solution can be spun onto the substrate.

In some embodiments, the shadow mask can be a stencil (e.g., a large area stencil, micro-stencil, nano-stencil). For example, a micro-stencil with the desired pattern can be fabricated on a substrate such as a silicon wafer. In some embodiments, the deposition can be used in combination with soft fabrication techniques where the substrate is an elastomeric stamp, mold, conformable photomask, and the like. Patterns can be deposited on the substrate via standard photolithography techniques, shadow masking techniques, or any other technique as would be appreciated by one of ordinary skill in the art. Exemplary lithography processes include nanoimprint lithography, optical lithography (e.g., water-based optical lithography), plasma etching, and laser machining. In some embodiments, the patterned conductive structures can be formed on a silk matrix via various printing processes. Exemplary printing processes include microfluidic printing, inkjet printing, laser printing, and thermal printing.

In some cases, at least a portion of the wrinkled silk layer surface is exposed to an erasing agent (e.g., MW, WV, or UV) for a duration and/or intensity sufficient to induce a desired beta-sheet content. In some embodiments, the erasing agent is applied for a duration and/or intensity sufficient to induce the silk fibroin within the region to have a beta-sheet content from 0.1% to 60%. In some embodiments, the silk fibroin in the region exposed to the erasing agent has a beta-sheet content of at least 5%, at least 10%%, at least 11%%, at least 12%%, at least 13%%, at least 14%, at least 15%%, at least 16%%, at least 17%%, at least 18%%, at least 19%%, at least 20%%, at least 21%%, at least 22%, at least 23%, at least 24%, at least 25%, at least 26%, at least 27%, at least 28%, at least 29%, or at least 30%. In some embodiments, the silk fibroin in the region exposed to the erasing agent has a beta-sheet content of less than 35%, less than 36%, less than 37%, less than 38%, less than 39%, less than 40%, less than 41%, less than 42%, less than 43%, less than 44%, less than 45%, less than 46%, less than 47%, less than 48%, less than 49%, less than 50%, less than 51%, less than 52%, less than 53%, less than 54%, less than 55%, less than 56%, less than 57%, less than 58%, less than 59%, or less than 60%.

In some embodiments, the silk layer may be formed on the flexible polymer substrate such that the silk layer forms an inverse opal having structural color. As used herein, the term "structural color" refers to colors caused by interference effects rather than by pigments. Structural color is caused by the interaction of light with structures of nanoscale periodic structure, with geometries on the order of magnitude of visible light wavelengths. Light that encounters these minute structures is subject to optical phenomena including thin film interference, multilayer interference, diffraction grating effects, photonic crystal effects, and light scattering. These phenomena lead to selective reflection of particular light wavelengths through constructive and destructive interference. In some embodiments, the silk layer can be structurally manipulated to diffract light of a particular wavelength, resulting in perceived color. For example, the structural color may be adjusted based on a number of factors, including the diameter of the periodic cavities, or voids, and a lattice constant.

In some embodiments, the silk layer may be configured to exhibit structural color by incorporating periodic cavities within the silk layer, where the periodic cavities form a lattice constant. As used herein, the term "lattice constant" refers to a center-to-center distance of the periodic cavities in the silk layer. The periodic cavities may be incorporated into the silk layer by inducing a plurality of particles (e.g. polystyrene particles or poly(methyl methacrylate) particles) to assemble into a lattice. This may occur by depositing a solution containing the particles to the surface of the flexible polymer substrate, and allowing the solution to evaporate, forming a lattice structure with the particles. A silk solution is then cast over the lattice of particles to form the silk layer. Once the silk layer is formed, the particles can be removed by exposing the silk layer to a solvent to selective dissolve the particles, and not the silk layer (e.g., toluene or ethyl acetate). Removing the particles forms periodic cavities within the silk layer that allow the material to exhibit structural color.

In some embodiments, the periodic cavities in the silk fibroin layer may have an average diameter that ranges from about 5 nm to about 2000 nm, or more. For example, the periodic cavities may have an average diameter of at least about 5 nm, at least about 10 nm, at least about 15 nm, at least about 20 nm, at least about 25 nm, at least about 30 nm, at least about 35 nm, at least about 40 nm, at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575, at least about 600, at least about 650, at least about 700, at least about 750, at least about 800, at least about 850, at least about 900, at least about 950, at least about 1000, or more.

In some embodiments, the periodic cavities 28 may have an average diameter that is at most 2000 nm, or at most 1500 nm, or at most 1400 nm, or at most 1300 nm, or at most 1200 nm, or at most 1100 nm, or at most 1000 nm, or at most 900 nm, or at most 800 nm, or at most 700 nm, or at most 600 nm, or at most 500 nm, or less.

In some embodiments, the lattice constant of the silk fibroin layer (when in the form of an inverse opal) may range from about 5 nm to about 2000 nm, or more. For example, lattice constant may be at least about 5 nm, or at least about 10 nm, or at least about 15 nm, at least about 20 nm, at least about 25 nm, at least about 30 nm, at least about 35 nm, at least about 40 nm, at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575, at least about 600, at least about 650, at least about 700, at least about 750, at least about 800, at least about 850, at least about 900, at least about 950, at least about 1000, at least about 1500, or at least about 2000 nm or more.

In some embodiments, the structural color of the silk layer may be adjusted by transitioning the silk layer from the wrinkled state to the wrinkle-free state. For example, the wrinkled state may exhibit a first structural color, which may be adjusted to a second structural color when the silk layer is transitioned to the wrinkle-free state (e.g., on exposure to the external stimuli).

Applications

The capacity to reconfigure and repeatedly induce and then remove reversible wrinkles in silk-based materials makes the materials tunable and provides unexpected versatility to these articles.

In another aspect, reversibly wrinkled silk-based materials of this disclosure are advantageous for various applications related to information storage. Information storage-based applications of the methods and compositions provided herein include, without limitation, printing two-dimensional barcode (e.g., QR code) patterns, storing fingerprinting data, and printing with fluorescently doped silk. Since the methods of this disclosure reversibly show the hidden patterns and can be repatterned after permanent erasure, silk-based wrinkling methods and materials are particularly well-suited for information encryption and anti-counterfeiting applications.

In order to realize information storage, a QR was printed on crystalline silk-based wrinkling system by a Dimatix Material Inkjet Printer (DMP 2831, Fujifilm Dimatix, Santa Clara, CA) equipped with a distilled water-loaded cartridge. The wrinkled structures became smooth in the printed areas due to the stimulation of water. The printed information was permanently removed by erasing all the wrinkled structure by WV.

Reversible wrinkle patterns can be used to store sensitive information. By way of example, temporary storage and subsequent erasure of sensitive information can be achieved by exposing a silk bilayer composition as described herein to UV irradiation under a shadow mask configured to convey the desired information. Following UV light exposure, the silk layer is wrinkled by heating and then cooling the bilayer substrate as described herein, and then exposing the wrinkled bilayer to methanol vapor until the unmasked area returns to a flattened, wrinkle-free conformation, thus revealing the hidden information. In some cases, a silk bilayer composition is exposed to UV light for about 30 minutes under a shadow mask. In some cases, the wrinkled, masked bilayer is exposed to MV for about 30 minutes to allow the unexposed area to return back to flatten surface, during which the exposed area still show wrinkles with no response to MV. Finally, all wrinkled information can be erased by exposing the entire bilayer composition to MV for an extended period of time.

In another example, human fingerprint information can be saved on an amorphous silk-based bilayer permanently by pressing the sample gently with a fingertip prior to wrinkle formation. Wrinkling and de-wrinkling steps can be performed to reveal and hide the human fingerprint information, respectively.

In another example, a silk fibroin solution is mixed with rhodamine B or fluorescent quantum dots (QDs) to produce a doped silk solution. For example, the doped silk solution can comprise rhodamine B and CdSe/ZnS quantum dots. The doped silk solution can be spin-coated onto a flexible polymer substrate (e.g., PDMS) as described herein. As demonstrated in Example 1, words can be patterned on rhodamine B and quantum dots doped wrinkling surface using UV light or water vapor. Chemiluminescence systems can be used to reveal patterns in the doped silk surface. Doped silk solutions are particularly advantageous for anti-counterfeiting applications of wrinkled silk-based materials. As demonstrated in Example 1, illumination of a wrinkled bilayer formed using a silk solution mixed with rhodamine B (RhB) or quantum-dots (QD) revealed that wrinkled samples are highly fluorescent under the illumination of UV light, and they show similar fluorescence emission intensities as the wrinkle-free samples when viewed from the direction normal to sample surface, consistent with the results of fluorescence emission spectra (see FIG. 14). However, in lateral view, wrinkled samples exhibit stronger emission than the wrinkle-free samples owing to the enhanced diffusion ability of wrinkled structure. This viewing angle-differentiated emission, combined with the ease of patterning of the wrinkled structure, enables fluorescence-based anti-counterfeiting.

In another aspect, reversibly wrinkled silk-based materials of this disclosure are advantageous for various light and thermal management applications. For example, silk-based wrinkled materials can be used for smart window systems, light-to-thermal energy conversion systems, and infrared-reflecting systems.

To demonstrate use of reversibly wrinkled silk-based materials as smart windows, a silk/PDMS bilayer was placed on a conductive Indium-Tin-Oxide (ITO) heater, using 1 mm PDMS strips as spacers to avoid contact between the PDMS layer and the ITO heater. A power supply provided DC voltage to an ITO-coated glass slide and to the silk/PDMS sample through an Au contact electrode at the film edge. Transmittance data between wrinkled samples formed by hot plate and by ITO heater were used to define suitable DC voltage values. The temperature in the ITO heater was measured by an IR thermal imaging system. The silk/PDMS bilayer sample was heated via the ITO heater by DC voltage for 5 minutes and then cooled to room temperature for another 5 minute to induce wrinkling on the silk layer surface. The wrinkles could be erased using an erasing agent (e.g., water vapor) or approaching finger. This process is repeatable and reliable.

For use in light-to-thermal energy conversion system, a thermocouple probe is used in conjunction with a wrinkled/wrinkle-free silk bilayer composition. The thermocouple probe, when beneath or adjacent to the silk bilayer, detects the temperature evolution upon illumination of the silk bilayer.

For use in infrared-reflecting systems, broadband infrared-reflecting samples can be prepared by depositing an aluminum layer (20 nm) onto the wrinkled/wrinkle-free silk bilayer composition, for example using a thermal evaporator (e.g., LC Technologies thermal evaporator). IR thermal imaging can be used to capture images of temperature in the infrared-reflecting samples.

In various embodiments, reversibly wrinkled silk-based materials of this disclosure can be sized to match various needs, e.g., optical, biomedical applications described herein.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

As used herein and in the claims, the singular forms include the plural reference and vice versa unless the context clearly indicates otherwise. Other than in the operating examples, or where otherwise indicated, all numbers expressing quantities of ingredients or reaction conditions used herein should be understood as modified in all instances by the term "about."

As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Unless defined otherwise, all technical and scientific terms used herein have the same meaning as those commonly understood to one of ordinary skill in the art to which this invention pertains. Although any known methods, devices, and materials may be used in the practice or testing of the invention, the methods, devices, and materials in this regard are described herein.

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention.

Example 1

Reference is now made to the following examples, which together with the above descriptions illustrate the invention in a non-limiting fashion.

This example demonstrates the fabrication of reversible, multi-responsive wrinkling micropatterns using silk fibroin as the stimuli-responsive component. In particular, this example demonstrates that silk wrinkle structures can be dynamically tuned and/or erased using processes that include the controlled exposure of a wrinkled silk composition to water vapor (WV), methanol vapor (MV), or UV irradiation, which can induce controllable structural transitions of silk protein. It is further demonstrated that wrinkle formation dynamics and evolution rates are dominated by the starting conformation of silk protein. The wrinkle evolution behavior is confirmed by investigating the molecular mechanism governing the conformational transition of silk fibroin. Finally, we demonstrate that this protein-based responsive wrinkling system can be used for demonstrator devices in information storage, encryption, collection and extraction, anti-counterfeiting, as well as smart window and thermal regulation.

Formation of Protein Wrinkles

The strategy for the fabrication of the reversible wrinkle pattern is shown in FIG. 3B. A bilayer system was first fabricated by spin-coating a very thin layer of stiff silk film onto soft polydimethylsiloxane (PDMS) substrate. Control over the assembly of the protein layer's crystallinity enables its ability to change conformation controllably on the nanoscale. The application of an external thermal stimulus induces surface wrinkling with labyrinth-like morphology because of the two materials' thermo-mechanical mismatch.

Protein Conformation and Wrinkle Dynamics

As a structural protein, silk fibroin undergoes conformational transition when triggered by external stimuli, such as water vapor, methanol or deep UV light. Such external stimuli can affect hydrogen bonding between protein chains (FIG. 3a) and induce β-sheet structure formation, consequently converting a water soluble material into a water insoluble format.[22-24] Further, ultraviolet radiation is able to induce photodegradation of silk fibroin at the weaker C—N bonds (FIG. 3a), and induce considerable decrease in the protein's degree of crystallinity[24-26]. This polymorphic transition of silk fibroin is central to the control of the molecular chain movement at the nanoscale, offering the possibility to controllably tune the pattern morphology of the material. This has been demonstrated, among other formats, with engineered nanofibrillar structures and inverse opal lattices.

The ability to control conformational transitions in silk is used to impart dynamic behavior to the wrinkled structures formed as described above. These structures are stable in ambient conditions, providing a repeatable starting point for surface modulation. Controlled application of external stimuli can trigger the release of the compressive stress within the bilayer system thus leading to the tuning/erasure of the wrinkle topography.

Figures 4A, 4B, 4C, 4D, 4E, 4F, 4G, 4H, 4I:
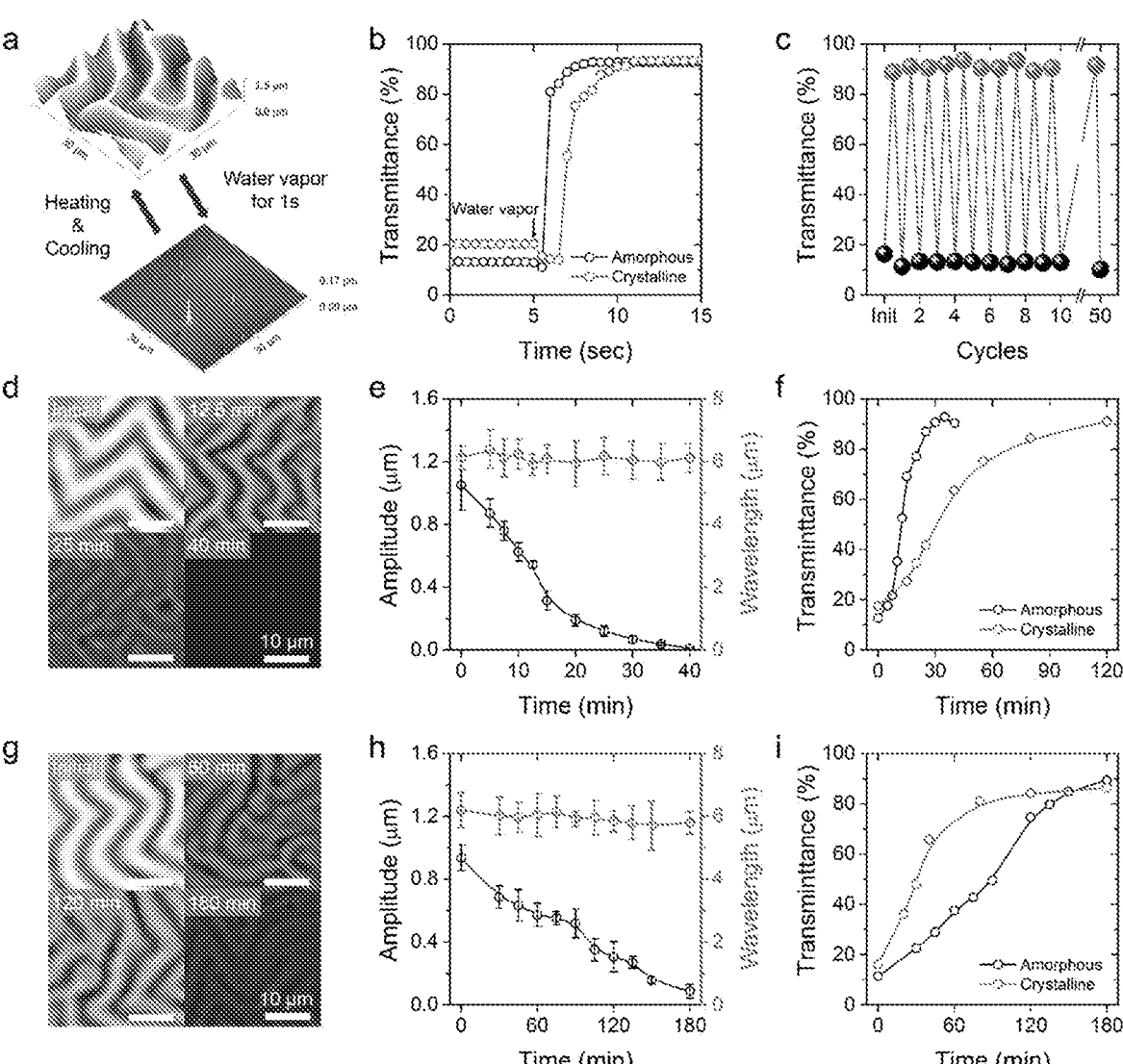
Figures 7A, 7B, 7C, 7D, 7E:
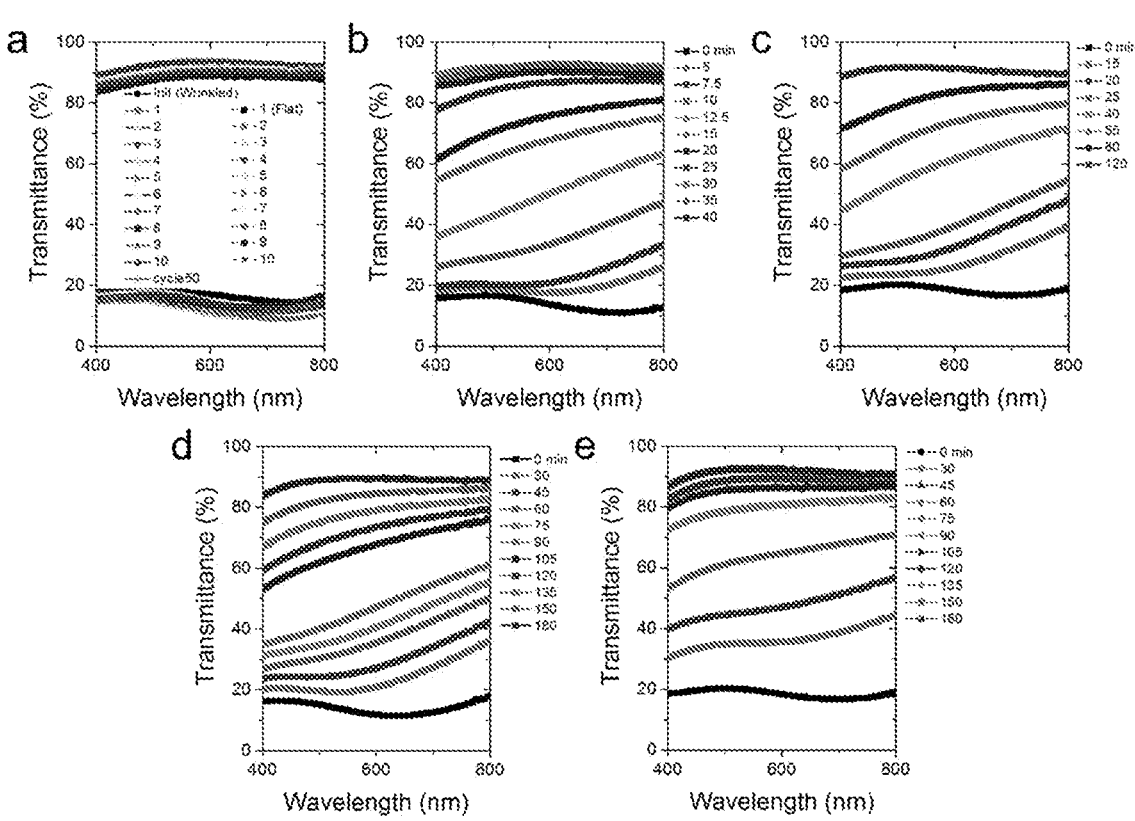

This was explored by applying the stimuli identified above to the protein wrinkle system and are illustrated in FIG. 4. When the wrinkled surface is exposed to water vapor (WV), the pattern disappears, smoothing the surface (FIG. 4a). We found that this "erasing" process is fast and affected by the conformation of silk fibroin. Because the initial wrinkled bilayer is opaque and it becomes transparent after wrinkle removal (wrinkle-free state), wrinkle dynamics can be monitored by evaluating light transmittance through the system, showing >80% transmission after about 1 second of exposure to water vapor (or about 3 seconds for crystalline silk) (FIG. 6a-6b). Structural stability of the silk/PDMS bilayer system enables a reversible and repeatable transition between the wrinkled and unwrinkled states over multiple cycles (FIG. 4c and FIG. 7a). Additionally, selective exposure to WV using shadow masking approaches allows to define patterns of wrinkled topographies (FIG. 3b and FIG. 8a).

Exposure to methanol vapor (MV) can also induce protein conformational change and affect the wrinkle dynamics albeit with longer times (40-120 minutes depending on the initial crystalline state of the protein layer). AFM was used to examine surface morphology of amorphous silk-based wrinkle patterns (FIG. 4d, and FIG. 8a). The wrinkle spacing λ stays mostly constant while the amplitude A decreases dramatically with the exposure time leading to surface flattening (FIGS. 4e-4f, and FIGS. 7b and 7c). Finally, UV exposure was used to induce conformational change in the material (FIGS. 4g-4i). In this case, the response dynamics favor the crosslinked state of the protein and, expectedly, are dependent on the values of irradiance onto the material, with higher powers leading to shorter de-wrinkling times (FIG. 4i, see also FIGS. 7d and 7e). Similarly to what previously described for MV, selective exposure of the wrinkled surface to UV light allows for pattern encoding and high-resolution surface reshaping (FIG. 3b and FIG. 8b).

Tuning of the wrinkle patterns is based on the structural modification of the protein film in response to the external stimuli mentioned above. The effect of water or methanol vapor is ascribed to their interaction with the polar groups of silk fibroin chains[23]. Water/methanol molecules penetrate the silk matrix and affect the hydrogen bonding between silk fibroin chains (FIG. 3a), thus leading to molecular rearrangement[23] and, in turn, the release of the compressive stress within the bilayer system. Fourier-transform infrared spectroscopy (FTIR) measurements show that the amorphous silk matrix is still dominated by random coil structure after 50 wrinkling/de-wrinkling cycles (FIG. 5a), underscoring the performance stability of the system when using WV as a stimulus (FIG. 4c). However, methanol molecules permeate the silk more slowly than water due to their larger molecular size and the plasticizing behavior of methanol is also weaker than that of water[23], which implies the fraction of the amorphous regions affected by MV is less than WV (FIG. 5c ii). Hence, the MV wrinkle dynamics are slower than WV, no matter which conformation is involved in the silk matrix. The FTIR result in FIG. 5a shows that a certain fraction of β-sheet structure is formed after one wrinkling/de-wrinkling cycle using MV, demonstrating the quick structural transition induced by MV.

If amorphous silk is interacted with WV/MV, conformational transition from random coil and/or helix structure ($1645 \text{ cm}^{-1}$ in FTIR) to β-sheet structure ($1621 \text{ cm}^{-1}$) occurs (FIG. 5a)[22,24]. During this process, most of the molecular chains within the silk matrix are free to rearrange. However, if crystalline silk is subjected to WV/MV treatment, the water/methanol molecules can only penetrate into non-crystalline regions[23] to induce local molecular rearrangement, and there is no conformational transition (FIG. 5b). Therefore, the response of amorphous silk-based wrinkled bilayer to WV/MV is faster than that of crystalline silk. In the case of WV, the stress release behavior is very fast because of the rapid penetration of small water molecules into all amorphous regions of silk matrix (FIG. 5c, i).

The origin of deep UV light irradiation induced modulation of wrinkled structure can be interpreted by the structural transition during photodegradation of silk proteins induced by UV light[24,26]. When amorphous silk is exposed to UV light, the absorption peaks in the FTIR spectrum decrease slightly (FIG. 5a), demonstrating the peptide scission. However, if crystalline silk is interacted with UV light, peak shift occurs in addition to the decrease in the intensity (FIG. 5b), indicating that the peptide scission is accompanied by the structural transition from β-sheet to random coil or helix (FIG. 5c, iii)[25,48]. This additional conformational transition brings about more molecular rearrangement and then greater disturbance of localized stress field. Therefore, crystalline silk-based wrinkle pattern is more sensitive to UV light than amorphous silk (FIG. 4i).

Application of Dynamic Wrinkles for Encoded Wrinkle Patterned Surfaces

The high sensitivity, excellent reversibility, and tunable responsiveness of the dynamic wrinkle patterns described herein, together with the versatility of silk, makes them suitable for various top-down transformation approaches that add utility to these systems. A sampling of demonstrator devices is illustrated in FIGS. 10a-10e.

Figures 10A, 10B, 10C, 10D, 10E:
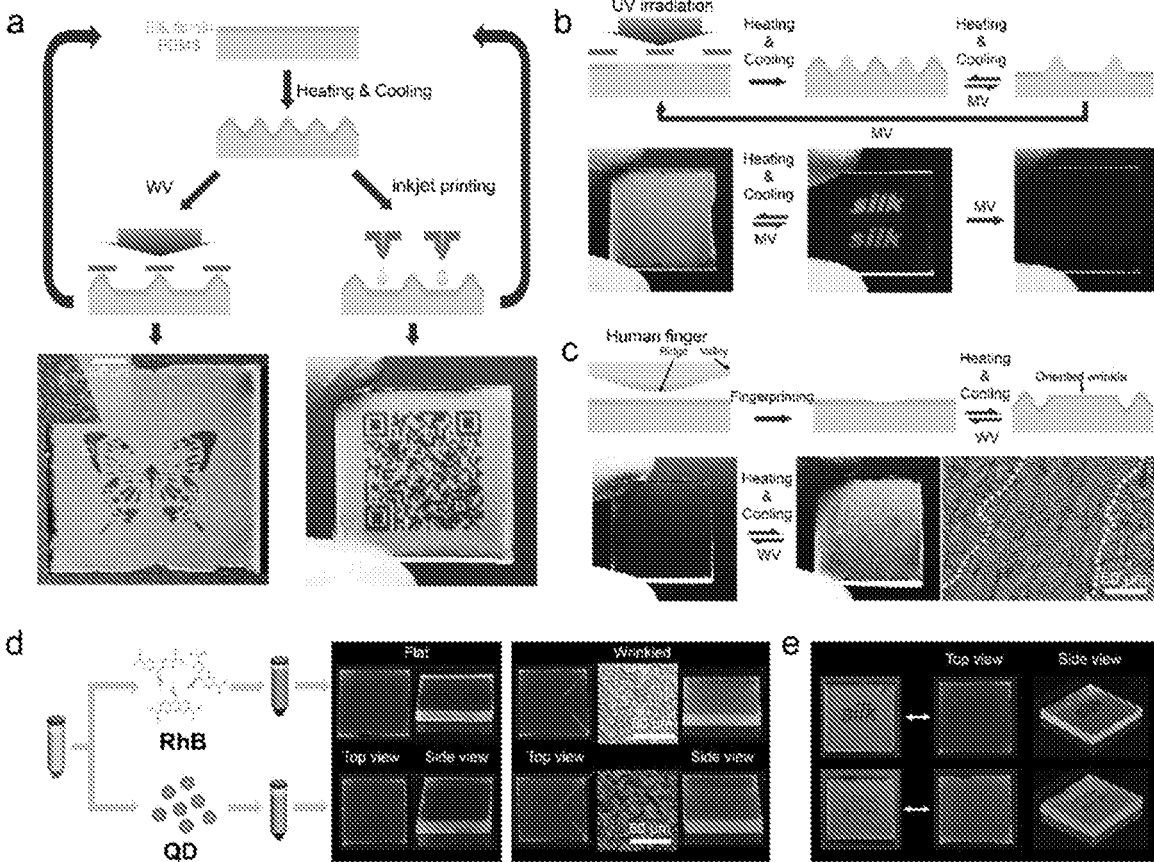

Secondly, the behavior of solvent penetration controlled de-wrinkling offers the possibility for the design of a reversible solvent-responsive pattern by removing wrinkle regionally. To this end, we patterned the wrinkle-free bilayer using deep UV. The details of a fabrication process and the responsive scheme are illustrated in FIG. 10b. When the post-treated bilayer forms wrinkles, the patterns are invisible, but after exposed to MV for a certain time (~30 min), the hidden patterns "silk" appear (FIG. 10b). This process is reversible and can be repeated for many times. However, the appeared patterns will be permanently erased if the sample continues to be kept in MV for a while, and the resulting wrinkle-free bilayer can be processed again by UV exposure. It is possible that methanol molecules have more difficulty infiltrating the UV patterned regions as compared to the unpatterned regions as a result of the decreased free volume of silk matrix induced by UV irradiation. Therefore, the wrinkles in the UV exposed regions are less sensitive to MV and they still remain when the wrinkles in the unpatterned regions are completely erased (FIG. 12). However, with the further increase of MV exposure time, the methanol molecules gradually penetrate the patterned region and erase wrinkles. It should be mentioned that the UV patterned regions show similar response to WV as the unpatterned regions due to the high sensitivity of silk protein to water molecules. Such system, which can reversibly show the hidden patterns and can be repatterned after permanent erasure, may find a unique place in information encryption applications.

Thirdly, the tunability of glass transition temperature by water content in amorphous silk film makes it possible to design micro/nanopatterns by imprinting process at room temperature[12]. To utilize this idea, we performed fingerprinting process on amorphous silk-based bilayer system. As illustrated in FIG. 10c, the fingerprint on flat bilayer is almost invisible, but it immediately appears after forming wrinkles due to the enhanced contrast between printed areas and surrounding areas. Microscopy images show that the wrinkles in the fingerprinted regions are oriented rather than arranged randomly like the unprinted regions (FIG. 10c and FIG. 13), which should be caused by the boundary effect[49] due to the reduced thickness of fingerprinted areas, resulting in reduced light diffusion. This wrinkle-free printing and wrinkle-forming revealable printed pattern is reversible and will be applicable as an information collection and extraction tool for applications such as forensic investigations.

Furthermore, the easy functionalization of silk fibroin through simple mixing of various inorganic or organic dopants into the water-based solution[4,14] enable a variety of functional wrinkling surfaces. To demonstrate this, silk solution mixed with rhodamine B (RhB) or quantum-dots (QD) was used to form bilayer system. As shown in FIG. 10d, the wrinkled samples are highly fluorescent under the illumination of UV light, and they show similar fluorescence emission intensities as the wrinkle-free samples when viewed from the direction normal to sample surface, consistent with the results of fluorescence emission spectra (FIG. 14). However, in lateral view, wrinkled samples exhibit stronger emission than the wrinkle-free samples owing to the enhanced diffusion ability of wrinkled structure. This viewing angle-differentiated emission, combined with the ease of patterning of the wrinkled structure, enables fluorescence-based anti-counterfeiting. As shown in FIG. 10e, the pattern of "silk" or digitals, printed on RhB-silk or QD-silk formed wrinkles, respectively, is invisible if observed in the vertical direction but is clearly visible in a non-vertical direction. Importantly, this switching between appearance and disappearance of the anti-counterfeiting wrinkle patterns do not need external stimuli, benefiting their practical applications.

Optical and Thermal Management with Protein Wrinkles

In addition to the information-related applications, the high reversibility and the excellent light scattering capacity of the wrinkled surface makes it applicable for optical and thermal management (FIGS. 16a-16i).

Firstly, we showed that our highly reversible wrinkle pattern is suitable for switchable optical windows. To demonstrate this idea, we combined our bilayer system with an ITO heater by using PDMS strips as spacers to develop an electricity-responsive dynamic wrinkling system (FIG. 16a, top). The controlled tunability between wrinkled and wrinkle-free state by applying voltage and WV exposure, respectively, leads to switchable optical transparency (FIG. 16a, bottom). The as-prepared wrinkled surface is opaque with a frosted glass-like appearance because of the extensive scattering of light by the microstructures, and the covered Tufts University logos could not be observed. When the device is treated by a humidifier or approached by a finger, it quickly becomes transparent and clearly shows the transmitted image (data not shown). We also evaluated the optical transparency of the device under different voltages, which induce different electrical-to-thermal energy conversions (data not shown). As shown in FIG. 16b, the light transmittance decreases with the increase of voltage, indicating the controllability of optical properties of the device. Using this device, we could also investigate the wrinkle formation process after cessation of the voltage. As shown in FIG. 16c, the wrinkle pattern gradually appears with the bilayer system gradually cools down to room temperature and shrinks to its original state, which is accompanied by the gradual decrease of light transmittance. During this process, the wavelength remains almost unchanged (FIG. 16c), indicating the increase of amplitude with the formation of wrinkle.

Next, we showed that the high light diffusion of the wrinkled surface enables transmitted thermal regulation through photon-to-thermal energy conversation. Wrinkled surfaces can cause light diffraction when a light beam propagates through these samples[36]. If wrinkle-free sample is illuminated by a white light (FIG. 16d, left), only a light spot can be observed on the screen. However, a diffraction ring pattern (concentric rings) can be observed for the wrinkled sample (FIG. 16d, right). Based on these facts, we measured the temperature increase in the central light spot when a white light beam passes through the wrinkle-free or wrinkled sample with setup shown in FIG. 16e. A temperature increase of about 6.4° C. is generated for the wrinkle-free sample, while it is only about 1.5° C. for a wrinkled sample, demonstrating the ability of wrinkling system to defocus the thermal energy to avoid local overheating (FIG. 16f). Moreover, we show that our silk-based wrinkling system can be used as a template to develop aluminum-based infrared-reflecting system for infrared radiation regulation. We visualized their infrared appearance using a thermal infrared camera under a constant incident heat flux (FIG. 16g). As illustrated in FIG. 16h, the temperature of wrinkled surface (~41.6° C.) is about 1.9° C. lower than that of flat surface (~43.5° C.) due to the enhanced diffuse reflection of wrinkled sample[50]. We also selectively eliminated the wrinkle using WV before aluminum deposition to obtain patterned infrared-reflecting system (FIG. 16i, top). The butterfly wing pattern can be clearly see under infrared imaging (FIG. 16i, bottom), offering the possibility for infrared information display.

We have demonstrated the fabrication of highly reversible, multi-responsive, and responsive tunable wrinkling dynamics in a silk/PDMS bilayer system. The interaction between silk matrix and solvents/light that can trigger molecular rearrangement of silk protein through inducing controllable conformational transition and/or movement of protein chains allows the tuning/erasure of wrinkle patterns and redefinition of physical properties. We show that the responsiveness of wrinkle morphologies to solvents/light depends on whether conformational transition of silk fibroin occurs. Specifically, the wrinkle pattern shows faster erasure rate if conformational transition is induced by an external stimulus. On the other hand, solvent with smaller molecular size offers faster erasure of wrinkled structure. Thanks to the polymorphic nature and versatility of silk fibroin, the resulting unique responsive wrinkling dynamics motivate the development of a series of devices not only for information storage, encryption, collection and extraction as well as anti-counterfeiting, but also for light diffusion related smart window and thermal regulation. We believe new applications will be driven by the incorporation of functional dopants, such as plasmonic nanoparticles, laser dyes, or photoactive or photochemical components within a structure protein. The combination of dynamic micropattern and a versatile biopolymer open new avenues for the design of various novel optical, biomedical, electronic, mechanical, and thermal devices.

Methods and Materials

Poly(dimethylsiloxane) (PDMS) (Sylgard 184, Dow Corning), Rhodamine B (Sigma-Aldrich, St. Louis, MO), Quantum dots (CdSe/ZnS eFlour 625NC, eBioscience), Methanol (Sigma-Aldrich, St. Louis, MO), ITO coated glass slide glass (Sigma-Aldrich, St. Louis, MO, 25 mm×25 mm×1.1 mm, 8-12 Ω/sq).

Preparation of Silk Fibroin Solution

Silk fibroin was extracted from the silk cocoons of the *Bombyx mori* silkworm with a process previously described[1]. Briefly, cocoons were cut in small pieces and boiled for 30 min in 0.02 M $Na_2CO_3$ (aqueous solution) and rinsed thoroughly with distilled water in order to remove the sericin layer. The extracted silk fibroin fibers were dissolved in a 9.3 M LiBr solution at 60° C. for 4 hours. After that, the solution was subsequently dialyzed against distilled water using a dialysis cassette (Fisherbrand, MWCO 3.5K) for 3 days, followed by centrifuging solution (9000 rpm) twice and the resultant supernatant was collected and stored at 4° C.

Preparation of Silk/PDMS Bilayer Wrinkling Surface

Transparent and stretchable PDMS with a thickness of ~2 mm was fabricated by mixing the base/curing agent at a 10:1 weight ratio. The mixed base/curing agent was poured onto a polystyrene petri dish and was left to cure at 60° C. overnight after degassing for 1 hour. The cured PDMS was cut into 1.5 cm square with razor blade and ripped off from a petri dish. Thereafter, the aqueous solution of silk fibroin (3.75 wt %) was spin-coated onto PDMS substrate at 500 rpm for 5 seconds and 3000 rpm for 60 seconds. Before spin coating, the PDMS substrate was treated with oxygen plasma (March CS-1701F Reactive Ion Etcher) at a pressure of 300 mTorr with 50 W for 30 seconds. The bilayer sample was heated to 140° C. for 5 min and then cooled to room temperature to form wrinkling surface (RH: 20-30%). The resulting samples were kept in dark dehumidifier for the subsequent experiment. To obtain silk/PDMS bilayer with different silk thickness, silk solution with different concentration was used.

Wrinkle Erasing by Water Vapor (WV), Methanol Vapor (MV) and UV Light Irradiation.

For WV and MV exposure, the chamber is a custom-made vapor cell. The cell has inlets for WV and MV. The samples were placed inside the chamber on the sample stage. The WV and MV were generated by a humidifier and saturated methanol solvent, respectively. Especially, UV irradiation was carried out by using VL-215. G UV germicidal lamps with a wavelength of 254 nm and intensity of 76 μW cm$^{-2}$. The distance between sample and UV lamp was about 5 cm. In order to realize the selective exposure to WV, MV and UV light, an invar shadow mask was covered conformally on the wrinkled surface. After the selective exposure was performed for a designed duration, the shadow mask was removed cautiously.

Measurement

Optical microscopy images were captured using an optical microscopy (BH-2, OLYMPUS) equipped with a charge coupled device camera (MicroPublisher 3.3 RTV, QImaging). The transmittance was evaluated by a UV-vis-NIR spectroscopy (Cary 60, Varian Inc., CA). AFM (Cypher ES system, Asylum Research, CA) with silicon cantilevers (Bruker, NIPP-21120-10, the typical frequency of 75 kHz) was used to measure the wavelength and amplitude of the wrinkles. Furthermore, Fourier transform infrared absorption spectroscopy (FTIR) (Bruker Lumos FTIR microscope, Billerica, MA) was used to evaluate the silk protein conformational change after various treatments such as water vapor, methanol vapor and UV irradiation. All the FTIR spectra were acquired in the range of 4000-600 cm$^{-1}$ at 4 cm$^{-1}$ resolution with an average of 16 scans. An infrared (IR) thermal imaging system (FLIR SC-645, FLIR System Inc, North Billerica, MA) was used to evaluate the temperature changes of samples or devices. IR images were captured and analyzed using software (FLIR Tools). The fluorescence spectra were collected by using a microplate reader (Synergy™ H1, BioTek, US). The emission profiles were obtained by exciting the samples at 490 nm. The fluorescence images were collected by using a DMi8 inverted microscope (Leica Microsystems, Inc. Buffalo Grove, IL) at excitation of 552 nm. All measurements were performed in ambient condition.

Designing for Various Applications

1. Information Strategy:
    1) Inkjet printing: In order to realize information storage, a QR was printed on crystalline silk-based wrinkling system by a Dimatix Material Inkjet Printer (DMP 2831, Fujifilm Dimatix, Santa Clara, CA) equipped with a distilled water-loaded cartridge. The wrinkled structures became smooth in the printed areas due to the stimulation of water. The printed information was permanently removed by erasing all the wrinkled structure by WV.
    2) UV patterning: For storing hidden information, the wrinkle-free silk/PDMS sample was exposed to a UV irradiation for 0.5 hours under a designed invar shadow mask. Subsequently, the sample was heated and cooled for inducing wrinkling surface. Then, the wrinkled sample was exposed to MV for approximately 30 minutes to allow the unexposed area to return back to flatten surface, during which the exposed area still show wrinkles with no response to MV. Finally, all wrinkled information was erased by continuing keeping the sample in MV for a while.
    3) Fingerprinting: A human fingerprint information was saved on amorphous silk-based bilayer permanently through pressing the sample gently with a fingertip before wrinkle formation. Then wrinkling/de-wrinkling cycle was performed to show/hide the human finger-print information, respectively.

4) Fluorescent doping: For the doped device, rhodamine B ($\lambda_{emission}$=586 nm) and CdSe/ZnS quantum dots ($\lambda_{emission}$=625 nm) doped silk solution were prepared by adding 37.5 μL (10 mg/mL) rhodamine B and 100 μL (10 μM) quantum dot to 1 mL of the dilute 3.75 wt % silk fibroin solution and gently stirring. The doped silk solution was spin-coated on PDMS substrate in the same manner as described above for the pristine silk fibroin/PDMS sample. For storing information, "Silk" and Arabic numbers were patterned on rhodamine B and quantum dots doped wrinkling surface using WV, respectively.

2. Light and Thermal Management:

1) Smart windows: For demonstration of smart windows, the silk/PDMS bilayer was placed on an ITO heater by using 1 mm PDMS strips as spacers to avoid contact between PDMS and ITO heater. DC voltage was supplied to ITO coated glass slide by a power supply to the silk/PDMS sample through an Au contact electrode at the film edge. We compared the transmittance data between wrinkled samples formed by hot plate and ITO heater to define proper DC voltage value, respectively. The temperature in the ITO heater was measured by an IR thermal imaging system. The sample was heated on ITO heater by DC voltage for 5 min and then cooled to room temperature for another 5 min to form wrinkling surface. And then, all wrinkling surface could be erased by WV or approaching finger. This process is repeatable and reliable.

2) Light-to-thermal energy conversion: A white light source (Osl-1 High Intensity Fiber Illuminator Light Source, ThorLabs, US) that was focused by a lens generated a light spot with size of 10 mm on the wrinkled/wrinkle-free sample, which was positioned on top of a custom-built chamber (4.5 cubic centimeter). A thermocouple probe which is connected with a monitor of thermometer was inserted into the box and placed right underneath the sample to detect the temperature evolution in the central of light spot. The distance between light source and sample, sample and probe are about 8 cm and 3.5 cm, respectively. The light power near the probe was measured by an optical power meter (PM100A, Thorlabs GmbH, Germany) and was ~110 mW.

3) Infrared-reflecting system: In order to fabricate broadband infrared-reflecting sample, we deposited aluminum layer (20 nm) onto the wrinkled/wrinkle-free sample by thermal evaporator (LC Technologies thermal evaporator). IR thermal imaging system was used to capture image of temperature in the infrared-reflecting samples. The device was exposed to an incident thermal source oriented at a 60° angle with respect to the surface of device. Thermal source temperature was 50° C.

REFERENCES

1 Lutolf, M. P. & Hubbell, J. A. Synthetic biomaterials as instructive extracellular microenvironments for morphogenesis in tissue engineering. *Nat Biotechnol* 23, 47-55 (2005).

2 Kramer, R. M., Crookes-Goodson, W. J. & Naik, R. R. The self-organizing properties of squid reflectin protein. *Nat Mater* 6, 533-538 (2007).

3 Smith, K. H., Tejeda-Montes, E., Poch, M. & Mata, A. Integrating top-down and self-assembly in the fabrication of peptide and protein-based biomedical materials. *Chem Soc Rev* 40, 4563-4577 (2011).

4 Tao, H., Kaplan, D. L. & Omenetto, F. G. Silk Materials—A Road to Sustainable High Technology. *Adv Mater* 24, 2824-2837 (2012).

5 Liu, X. L. & Wang, S. T. Three-dimensional nano-biointerface as a new platform for guiding cell fate. *Chem Soc Rev* 43, 2385-2401 (2014).

6 DeForest, C. A. & Tirrell, D. A. A photoreversible protein-patterning approach for guiding stem cell fate in three-dimensional gels. *Nat Mater* 14, 523-531 (2015).

7 Torculas, M., Medina, J., Xue, W. & Hu, X. Protein-Based Bioelectronics. *Acs Biomater Sci Eng* 2, 1211-1223 (2016).

8 Lowik, D. W. P. M., Leunissen, E. H. P., van den Heuvel, M., Hansen, M. B. & van Hest, J. C. M. Stimulus responsive peptide based materials. *Chem Soc Rev* 39, 3394-3412 (2010).

9 Dash, M. in *Smart Materials for Tissue Engineering: Fundamental Principles* 45-61 (The Royal Society of Chemistry, 2017).

10 Scheibel, T. & Leal-Egana, A. Silk-based materials for biomedical applications. *Biotechnol Appl Bioc* 55, 155-167 (2010).

11 Zhu, B. W. et al. Silk Fibroin for Flexible Electronic Devices. *Adv Mater* 28, 4250-4265 (2016).

12 Amsden, J. J. et al. Rapid Nanoimprinting of Silk Fibroin Films for Biophotonic Applications. *Adv Mater* 22, 1746-1749 (2010).

13 Perry, H., Gopinath, A., Kaplan, D. L., Dal Negro, L. & Omenetto, F. G. Nano- and micropatterning of optically transparent, mechanically robust, biocompatible silk fibroin films. *Adv Mater* 20, 3070-3072 (2008).

14 Kim, S. et al. All-water-based electron-beam lithography using silk as a resist. *Nat Nanotechnol* 9, 306-310 (2014).

15 Tsioris, K. et al. Rapid Transfer-Based Micropatterning and Dry Etching of Silk Microstructures. *Adv Mater* 23, 2015-2019 (2011).

16 Kim, S. et al. Silk inverse opals. *Nat Photonics* 6, 817-822 (2012).

17 Min, K., Kim, S. & Kim, S. Deformable and conformal silk hydrogel inverse opal. *P Natl Acad Sci USA* 114, 6185-6190 (2017).

18 Wang, Y., Li, M., Colusso, E., Li, W. & Omenetto, F. G. Designing the Iridescences of Biopolymers by Assembly of Photonic Crystal Superlattices. *Adv Opt Mater,* 6, 1800066 (2018).

19 Kurland, N. E., Dey, T., Kundu, S. C. & Yadavalli, V. K. Precise Patterning of Silk Microstructures Using Photolithography. *Adv Mater* 25, 6207-6212 (2013).

20 Tseng, P. et al. Directed assembly of bio-inspired hierarchical materials with controlled nanofibrillar architectures. *Nat Nanotechnol* 12, 474-480 (2017).

21 Jiang, J. J. et al. Protein Bricks: 2D and 3D Bio-Nanostructures with Shape and Function on Demand. *Adv Mater* 30, 1705919 (2018).

22 Hu, X. et al. Regulation of Silk Material Structure by Temperature-Controlled Water Vapor Annealing. *Biomacromolecules* 12, 1686-1696 (2011).

23 Wang, Y., Porter, D. & Shao, Z. Z. Using Solvents with Different Molecular Sizes to Investigate the Structure of Antheraea Pernyi Silk. *Biomacromolecules* 14, 3936-3942 (2013).

24 Wang, Y. et al. Modulation of Multiscale 3D Lattices through Conformational Control: Painting Silk Inverse Opals with Water and Light. *Adv Mater* 29, 1702769 (2017).

25 Shao, J. Z., Zheng, J. H., Liu, J. Q. & Carr, C. M. Fourier transform Raman and Fourier transform infrared spectroscopy studies of silk fibroin. *J Appl Polym Sci* 96, 1999-2004 (2005).

26 Sionkowska, A. & Planecka, A. The influence of UV radiation on silk fibroin. *Polym Degrad Stabil* 96, 523-528 (2011).

27 Yang, S., Khare, K. & Lin, P. C. Harnessing Surface Wrinkle Patterns in Soft Matter. *Adv Funct Mater* 20, 2550-2564 (2010).

28 Rodriguez-Hernandez, J. Wrinkled interfaces: Taking advantage of surface instabilities to pattern polymer surfaces. *Prog Polym Sci* 42, 1-41 (2015).

29 Bowden, N., Brittain, S., Evans, A. G., Hutchinson, J. W. & Whitesides, G. M. Spontaneous formation of ordered structures in thin films of metals supported on an elastomeric polymer. *Nature* 393, 146-149 (1998).

30 Efimenko, K. et al. Nested self-similar wrinkling patterns in skins. *Nat Mater* 4, 293-297 (2005).

31 Moon, M. W. et al. Wrinkled hard skins on polymers created by focused ion beam. *P Natl Acad Sci USA* 104, 1130-1133 (2007).

32 Lee, S. G. et al. Switchable Transparency and Wetting of Elastomeric Smart Windows. *Adv Mater* 22, 5013-5017 (2010).

33 Chandra, D. & Crosby, A. J. Self-Wrinkling of UV-Cured Polymer Films. *Adv Mater* 23, 3441-3445 (2011).

34 van den Ende, D., Kamminga, J. D., Boersma, A., Andritsch, T. & Steeneken, P. G. Voltage-Controlled Surface Wrinkling of Elastomeric Coatings. *Adv Mater* 25, 3438-3442 (2013).

35 Zeng, S. S. et al. Moisture-Responsive Wrinkling Surfaces with Tunable Dynamics. *Adv Mater* 29, 1700828 (2017).

36 Li, F., Hou, H., Yin, J. & Jiang, X. Near-infrared light-responsive dynamic wrinkle patterns. *Sci Adv* 4, eaar5762 (2018).

37 Qi, L. et al. Writing Wrinkles on Poly(dimethylsiloxane) (PDMS) by Surface Oxidation with a CO2 Laser Engraver. *Acs Appl Mater Inter* 10, 4295-4304 (2018).

38 Wang, J. J. et al. Light-Modulated Surface Micropatterns with Multifunctional Surface Properties on Photodegradable Polymer Films. *Acs Appl Mater Inter* 9, 37402-37410 (2017).

39 Kim, H. S. & Crosby, A. J. Solvent-Responsive Surface via Wrinkling Instability. *Adv Mater* 23, 4188-4192 (2011).

40 Hou, H. H., Yin, J. & Jiang, X. S. Reversible Diels-Alder Reaction To Control Wrinkle Patterns: From Dynamic Chemistry to Dynamic Patterns. *Adv Mater* 28, 9126-9132 (2016).

41 Li, F. D., Hou, H. H., Yin, J. & Jiang, X. S. Multi-Responsive Wrinkling Patterns by the Photoswitchable Supramolecular Network. *Acs Macro Lett* 6, 848-853 (2017).

42 Zong, C. Y. et al. Tuning and Erasing Surface Wrinkles by Reversible Visible-Light-Induced Photoisomerization. *Angew Chem Int Edit* 55, 3931-3935 (2016).

43 Rhee, D., Lee, W. K. & Odom, T. W. Crack-Free, Soft Wrinkles Enable Switchable Anisotropic Wetting. *Angew Chem Int Edit* 56, 6523-6527 (2017).

44 Lee, E. et al. Tilted Pillars on Wrinkled Elastomers as a Reversibly Tunable Optical Window. *Adv Mater* 26, 4127-4133 (2014).

45 Khang, D. Y., Jiang, H. Q., Huang, Y. & Rogers, J. A. A stretchable form of single-crystal silicon for high-performance electronics on rubber substrates. *Science* 311, 208-212 (2006).

46 Yin, J. W., Chen, E. Q., Porter, D. & Shao, Z Z Enhancing the Toughness of Regenerated Silk Fibroin Film through Uniaxial Extension. *Biomacromolecules* 11, 2890-2895 (2010).

47 Saravanan, D. Spider Silk—Structure, Properties and Spinning *J. Text. Apparel, Technol. Manag.* 5, 1-20 (2006).

48 Park, J. et al. Eco-friendly photolithography using water-developable pure silk fibroin. *Rsc Adv* 6, 39330-39334 (2016).

49 Huck, W. T. S. et al. Ordering of spontaneously formed buckles on planar surfaces. *Langmuir* 16, 3497-3501 (2000).

50 Xu, C. Y., Stiubianu, G. T. & Gorodetsky, A. A. Adaptive infrared-reflecting systems inspired by cephalopods. *Science* 359, 1495-1500 (2018).

We claim:

1. An article of manufacture, comprising:
   a layered composition comprising a silk fibroin substrate in direct contact with a flexible polymer substrate,
   wherein the layered composition, following heating and cooling of the layered composition, exhibits reversible wrinkles on at least a portion of a surface of the silk fibroin substrate, and wherein at least some of the reversible wrinkles are reduced or erased following exposure to water vapor, methanol vapor, or ultra violet (UV) radiation.

2. The article of manufacture of claim 1, wherein the silk fibroin substrate is or comprises amorphous silk fibroin.

3. The article of manufacture according to claim 1, wherein the silk fibroin substrate is or comprises silk fibroin characterized by a presence of β-sheet formation.

4. The article of manufacture according to claim 1, wherein the silk fibroin substrate and the flexible polymer substrate have different plane-strain moduli.

5. The article of manufacture according to claim 1, wherein the flexible polymer substrate is or comprises polydimethylsiloxane (PDMS).

6. The article of manufacture according to claim 1, wherein an extent of a change in reversible wrinkles is tunable with exposure time.

7. The article of manufacture according to claim 1, wherein an extent of a change in reversible wrinkles is tunable with water vapor exposure time.

8. The article of manufacture according to claim 1, wherein an extent of a change in reversible wrinkles is tunable with methanol vapor exposure time.

9. The article of manufacture according to claim 1, wherein an extent of a change in reversible wrinkles is tunable with UV radiation exposure time.

10. The article of manufacture according to claim 1, wherein the layered composition includes at least a portion of the silk fibroin substrate in a wrinkled state, wherein the wrinkled state is optically opaque.

11. The article of manufacture according to claim 1, wherein the layered composition includes at least a portion of the silk fibroin substrate in a wrinkle-free state, wherein the wrinkle-free state is optically clear having a visible light transmittance from 70% to 95%.

12. The article of manufacture according to claim 1, wherein at least a portion of the silk fibroin substrate exhibits structural color, and wherein the structural color is adjustable from a first structural color to a second structural color in response to the reversible wrinkles being reduced or erased following exposure to the water vapor, methanol vapor, or ultra violet (UV) radiation.

\* \* \* \* \*